United States Patent
Farrow et al.

(10) Patent No.: US 9,928,698 B2
(45) Date of Patent: Mar. 27, 2018

(54) ILLUMINATING CONTAINERS IN AN INVENTORY SYSTEM

(71) Applicant: Amazon Technologies, Inc., Seattle, WA (US)

(72) Inventors: Benjamin Lee Farrow, Sammamish, WA (US); Kristopher William Bell, Issaquah, WA (US); Wesley Scott Lauka, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 91 days.

(21) Appl. No.: 14/970,011

(22) Filed: Dec. 15, 2015

(65) Prior Publication Data

US 2017/0169672 A1    Jun. 15, 2017

(51) Int. Cl.
| G08B 5/36 | (2006.01) |
| G06K 7/10 | (2006.01) |
| G06Q 10/08 | (2012.01) |
| G06Q 10/00 | (2012.01) |

(52) U.S. Cl.
CPC .......... *G08B 5/36* (2013.01); *G06K 7/10366* (2013.01); *G06Q 10/00* (2013.01); *G06Q 10/087* (2013.01)

(58) Field of Classification Search
CPC ..... G08B 5/36; G06K 7/10366; G06Q 10/087
USPC .......................................... 340/6.1
See application file for complete search history.

(56) References Cited

U.S. PATENT DOCUMENTS

| 5,504,663 | A * | 4/1996 | Tucker | A01K 63/06 |
| | | | | 206/217 |
| 6,286,719 | B1 * | 9/2001 | Haines | B65D 81/36 |
| | | | | 222/113 |
| 8,280,547 | B2 | 10/2012 | D'Andrea et al. | |
| 9,087,314 | B2 | 7/2015 | Hoffman et al. | |
| 2002/0089847 | A1 * | 7/2002 | Nguyen | B65D 5/4233 |
| | | | | 362/154 |
| 2002/0180588 | A1 * | 12/2002 | Erickson | G06K 17/00 |
| | | | | 340/10.2 |
| 2004/0019462 | A1 * | 1/2004 | Gehrlein | B01F 3/02 |
| | | | | 702/188 |
| 2005/0149226 | A1 * | 7/2005 | Stevens | B65G 1/1371 |
| | | | | 700/214 |
| 2005/0236851 | A1 * | 10/2005 | Maginness | E01H 1/006 |
| | | | | 294/1.3 |
| 2006/0022801 | A1 * | 2/2006 | Husak | G06K 7/0008 |
| | | | | 340/10.5 |
| 2008/0122620 | A1 * | 5/2008 | Rachwalski | G06K 19/0723 |
| | | | | 340/572.1 |

(Continued)

FOREIGN PATENT DOCUMENTS

| JP | 2010120736 | 6/2010 |
| WO | 2006135830 | 12/2006 |

OTHER PUBLICATIONS

PCT/US2016/066363 , "International Search Report and Written Opinion", dated Jun. 26, 2017, 10 pages.

*Primary Examiner* — Yong Hang Jiang
(74) *Attorney, Agent, or Firm* — Kilpatrick Townsend & Stockton LLP

(57) ABSTRACT

An inventory system employs self-illuminating inventory management containers. A self-illuminating container can include a container body, an illumination element, and a signal receiver for receiving instructions to illuminate the container. The self-illuminating inventory management containers can be illuminated to assist in locating the containers in the system broadly, or locally, and to assist in inventory processing operations.

21 Claims, 23 Drawing Sheets

(56) References Cited

U.S. PATENT DOCUMENTS

| | | | | |
|---|---|---|---|---|
| 2010/0128165 | A1* | 5/2010 | Newcomb | G06K 9/20 |
| | | | | 348/370 |
| 2011/0153466 | A1 | 6/2011 | Harish et al. | |
| 2012/0062175 | A1* | 3/2012 | Miller | H02J 7/025 |
| | | | | 320/108 |
| 2013/0134931 | A1* | 5/2013 | Tomiki | H04B 5/0037 |
| | | | | 320/108 |
| 2014/0173439 | A1* | 6/2014 | Gutierrez | G08B 21/24 |
| | | | | 715/727 |
| 2014/0197926 | A1* | 7/2014 | Nikitin | G06K 7/10009 |
| | | | | 340/10.1 |
| 2015/0060319 | A1* | 3/2015 | Perry | B65D 25/205 |
| | | | | 206/459.5 |

* cited by examiner

ILLUMINATING CONTAINERS IN AN INVENTORY SYSTEM

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become non-trivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance. Additionally, expanding or reducing the size or capabilities of many inventory systems requires significant changes to existing infrastructure and equipment. As a result, the cost of incremental changes to capacity or functionality may be prohibitively expensive, limiting the ability of the system to accommodate fluctuations in system throughput.

Conventional methods of management of containers for routing inventory in an inventory system can include, for example, labeling containers; filling containers based on a container label; transporting the containers through the inventory system via conveyors, pallet movers, and by hand; storing containers; and loading containers for transit. Along the way, containers might be mislabeled, misplaced, or lost; labels might be misread, go unnoticed, or be damaged; and operators may inadvertently err in packing or directing containers.

BRIEF DESCRIPTION OF THE DRAWINGS

Various embodiments in accordance with the present disclosure will be described with reference to the drawings, in which.

DETAILED DESCRIPTION

Figure 1:
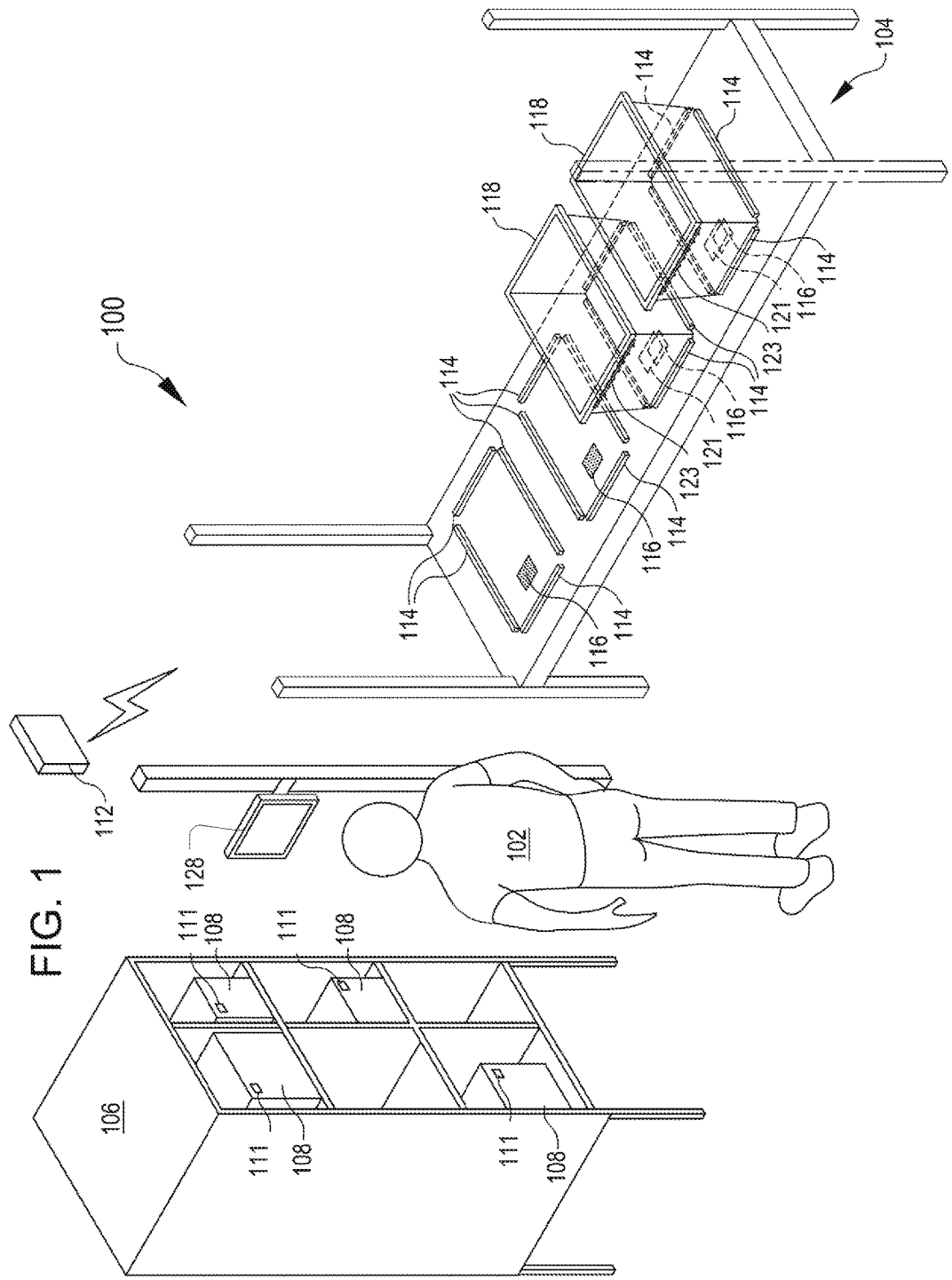
FIG. 1 illustrates an inventory system, in accordance with embodiments, that includes self-illuminating inventory management containers and an inventory management rack.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Various embodiments herein described relate to an inventory system having multiple inventory holders and drive units for moving the inventory holders. Specifically, features herein relate to self-illuminating inventory management containers in the inventory system, to methods of using the self-illuminating containers in the system, and to systems for using and for controlling the self-illuminating containers. The self-illuminating containers can be used for transporting items in groups or individually from one location in an inventory system to another, such as from a receiving location to a sorting and/or storage location, or from a storage location to a packaging and/or outbound shipping location. To this end, the inventory system can include inventory management systems such as computer-controlled inventory tracking and wireless communication systems for tracking particular inventory management containers, signaling inventory management containers, causing one or more self-illuminating containers to illuminate in one or more modes, and determining a location of an inventory management container.

In a conventional inventory system employing non-self-illuminating containers, time and effort can be wasted during order processing. For example, order processing can include an inventory management associate retrieving packages from a storage unit of the storage system for routing to a packaging location. The associate may retrieve packages from multiple storage shelves or cubbies in multiple storage units, and place the packages in different inventory management containers according to their respective destinations, e.g., individual packages for shipment to different customers. In a conventional system, a computer interface can indicate to the associate that package A is supposed to go in inventory management container #1, and that package B is supposed to go to inventory management container #2. If the associate places an item in an incorrect container in the conventional system, the error may not be realized until later in the packaging process of the inventory system. Also, the process of finding the correct inventory management container may take additional time, depending on the clarity of the management container label or the interface.

In an improved system that employs self-illuminating inventory management containers, the inventory system can determine which inventory management container is the correct container for the currently retrieved inventory item, and can signal the inventory management container to illuminate, thus providing the associate with an unmistakable indicator of the correct container for placing an inventory item. In some embodiments, a container platform supporting the container can include a scanner to determine, from a tag in or on the inventory item, when a particular inventory item is placed in the container thereon, and can further communicate this information to an inventory manager that can cause the inventory management container to illuminate (or to turn off illumination) in order to indicate a correct item placement, an incorrect item placement, or a reading error. In practice, the improved system helps an associate to be able to quickly pick items or packages and place them into an illuminated inventory management container without having to double-check a label or computer interface. The improved system also can eliminate having the associate provide a confirmation to the system to indicate when a package has been placed, thus saving significant time and preventing human error.

Self-illuminating containers also facilitate locating particular containers within an expansive inventory management facility. For example, an inventory management associate can be tasked with revising the contents of an inventory management container that is being processed in the inventory system. In a conventional inventory system, the inventory system, via a computer interface, may be able to assist the associate with determining an approximate location of a non-self-illuminating container. With only the approximate location, however, the task of pinpointing the location of and removing the inventory management container from processing may still be an onerous task, particularly in a large inventory system. In an improved system having self-illuminating inventory management containers, the inventory system can transmit a signal to the particular inventory management container, which can cause it to illuminate. In some embodiments, the inventory management container can be caused to illuminate in a particular color or pattern indicative that the inventory management container should be pulled for further processing. In some embodiments, pulling the inventory management container can be performed by any other inventory management associate, resulting in the earliest possible arrest of the inventory management container. In some embodiments, an automated system can scan for illuminated inventory management containers at locations in the inventory system and cause illuminated containers to be diverted automatically for further processing. In some embodiments, a combination of illumination and a return signal from the inventory management container can be used by the inventory system, such that an inventory management container can broadcast a return signal when queried by the inventory system in addition to illuminating, which may be used by the inventory system to determine a location of the inventory management container. Various embodiments are described in conjunction with the following figures.

FIG. 1 illustrates an inventory processing system 100 that includes inventory management containers 118, a container platform 104, and an inventory manager 112 for directing inventory items to inventory management containers, in accordance with embodiments. The container platform 104 can include multiple sets of partitions 114 for situating inventory management containers 118 on the container platform 104. Each set of partitions 114 can be associated with a scanning element 116 for scanning and/or interfacing with wireless-enabled tags and/or cards of inventory items or inventory management containers. For example, each inventory management container 118 can include a signal receiver such as a wireless-enabled card 121, which can store information about the particular inventory management container 118 that can include an identity, contents, expected contents, and/or an illumination status (e.g. on/off, or an illumination mode). In some embodiments, a signal receiver device can take other forms, such as a wired device that communicates with an inventory system via a contact plate or a plug-in connection, or the signal receiver device can be a wireless receiver device such as an RFID tag, a wireless network card, or other suitable wireless receiver. Each scanner 116 and wireless-enabled card 121 can be in communication with one another and with the inventory manager 112 via a network, which can be wireless. In some embodiments, each wireless-enabled card 121 can also be in communication with the associated scanning element 116 via a physical contact.

When the inventory manager 112 receives instructions for directing a particular inventory item to a particular inventory management container, the inventory manager 112 can issue instructions to one of the inventory management containers 118 at the container platform 104. The instructions can be received by the wireless-enabled card 121 of the selected inventory management container 118, and the wireless-enabled card 121 can cause an illumination element 123 to illuminate the inventory management container 118. The associated scanning element 116 of the selected inventory management container 118 can scan for a correct inventory item 108.

In parallel with the above, an associate 102 can be instructed, e.g. via a computer display 128, which can be a mounted or a mobile computing device, or any other suitable means of providing instructions, to select the correct inventory item 108 from an inventory storage unit 106, which can be an inventory holder 30 (FIGS. 2, 6), but can be any suitable device for storing inventory, such as a shelf, rack, platform, pallet, conveyor, another inventory management container, or other suitable container. The illustrated example of an inventory storage unit 106 includes multiple inventory items 108, each item including an identifying tag 111, which in some cases can be an RFID chip, but could alternatively be any suitable device for storing an inventory identity. When an inventory item 108 is received in one of the inventory management containers 118, the associated scanning element 116 can detect an identity of the placed inventory item 108 and relay information concerning the placed inventory item 108 to the inventory manager 112, which determines whether the correct inventory item 108 was received in the inventory management container 118. The inventory manager 112 can, depending on the result of the above determining act, instruct the illuminated inventory management container 118 to cycle through one or more further illumination modes. For example, if a correct inventory item 108 is received in the inventory management container 118, the inventory manager 112 can instruct the inventory management container 118 to turn off the illumination and/or to display a different illumination mode indicating a correct inventory item placement, e.g., by flashing a green light at the selected inventory management container 118. If an incorrect inventory item 108 is received in the inventory management container 118, the inventory manager 112 can, for example, cause the receiving inventory management container 118 to remain illuminated and/or to display a different illumination mode indicating an incorrect inventory item placement, e.g., by flashing a red light at the selected inventory management container 118. If an inventory item 108 is placed in a different inventory management container 118 than the designated container, the inventory manager 112 can cause both the intended inventory management container 118 and the receiving, incorrect inventory management container 118 to illuminate using one or more illumination modes, e.g., the intended inventory management container 118 can remain illuminated and/or begin to flash until the incorrectly placed inventory item 108 is moved to the intended inventory management container 118. The receiving, incorrect inventory management container 118 can display a red light until the incorrectly placed inventory item 108 is removed. The inventory manager 112 can also transmit instructions to illuminate selected inventory management containers 118 in various illumination modes at other locations in a larger inventory system 10 (FIG. 2) containing various processing locations.

Figure 2:
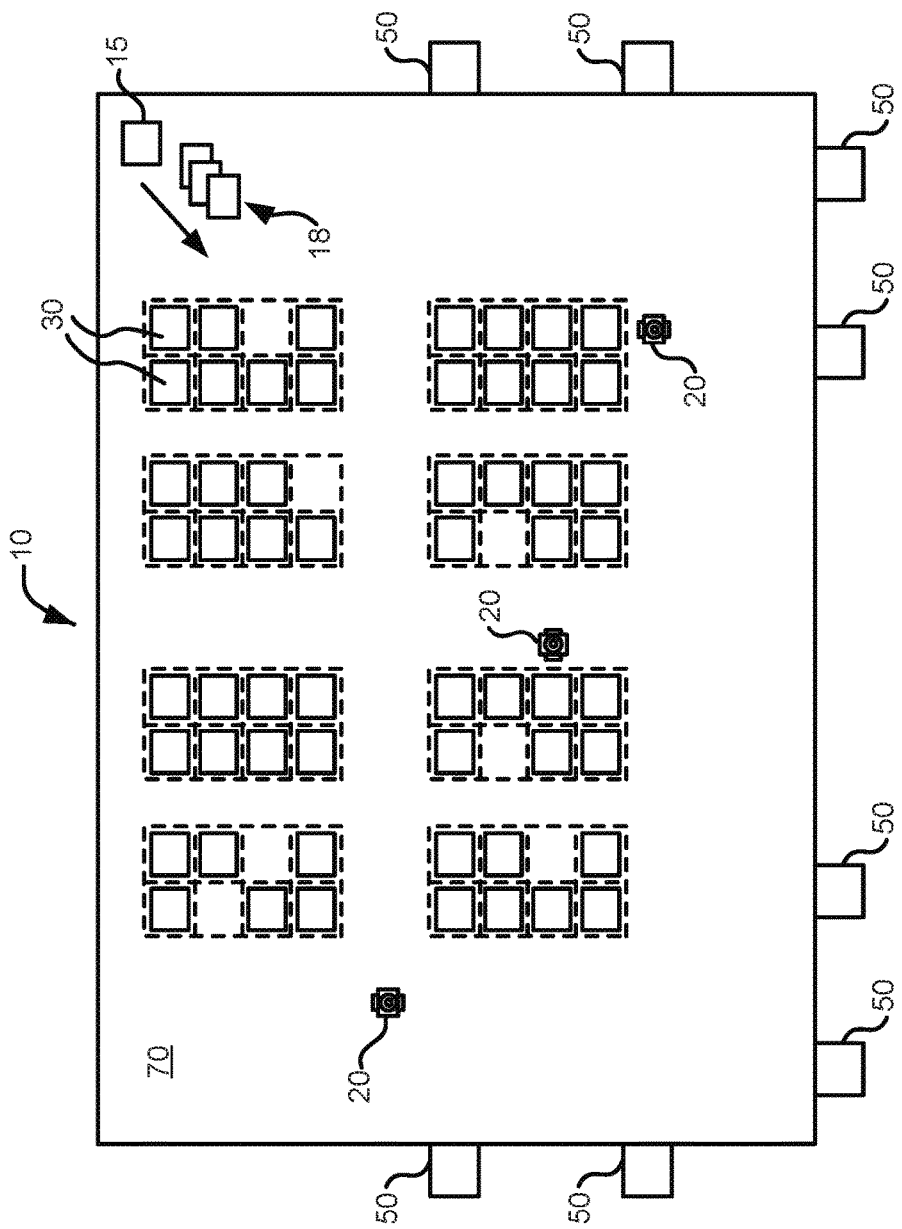
FIG. 2 illustrates components of an inventory system in accordance with embodiments.

FIG. 2 illustrates the components of an inventory system 10. The inventory system 10 includes a management module 15, one or more mobile drive units 20, one or more inventory holders 30, and one or more inventory stations 50. Mobile drive units 20 transport inventory holders 30 between points within a workspace 70 in response to commands communicated by management module 15. Each inventory holder 30 stores one or more types of inventory items. As a result, inventory system 10 is capable of moving inventory items between locations within workspace 70 to facilitate the entry, processing, and/or removal of inventory items from inventory system 10 and the completion of other tasks involving inventory items.

Management module 15 assigns tasks to appropriate components of inventory system 10 and coordinates operation of the various components in completing the tasks. These tasks may relate not only to the movement and processing of inventory items, but also to the management and maintenance of the components of inventory system 10. For example, management module 15 may assign portions of workspace 70 as parking spaces for mobile drive units 20, the scheduled recharge or replacement of mobile drive unit batteries, the storage of empty inventory holders 30, or any other operations associated with the functionality supported by inventory system 10 and its various components. Management module 15 may select components of inventory system 10 to perform these tasks and communicate appropriate commands and/or data to the selected components to facilitate completion of these operations. Although shown in FIG. 2 as a single, discrete component, management module 15 may represent multiple components and may represent or include portions of mobile drive units 20 or other elements of inventory system 10. As a result, any or all of the interactions between a particular mobile drive unit 20 and management module 15 that are described below may, in particular embodiments, represent peer-to-peer communication between that mobile drive unit 20 and one or more other mobile drive units 20. The components and operation of an example embodiment of management module 15 are discussed further below with respect to FIG. 3.

Mobile drive units 20 move inventory holders 30 between locations within workspace 70. Mobile drive units 20 may represent any devices or components appropriate for use in inventory system 10 based on the characteristics and configuration of inventory holders 30 and/or other elements of inventory system 10. In a particular embodiment of inventory system 10, mobile drive units 20 represent independent, self-powered devices configured to freely move about workspace 70. Examples of such inventory systems are disclosed in U.S. Pat. No. 9,087,314, issued on Jul. 21, 2015, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative embodiments, mobile drive units 20 represent elements of a tracked inventory system configured to move inventory holder 30 along tracks, rails, cables, crane system, or other guidance or support elements traversing workspace 70. In such an embodiment, mobile drive units 20 may receive power and/or support through a connection to the guidance elements, such as a powered rail. Additionally, in particular embodiments of inventory system 10 mobile drive units 20 may be configured to utilize alternative conveyance equipment to move within workspace 70 and/or between separate portions of workspace 70. The components and operation of an example embodiment of a mobile drive unit 20 are discussed further below with respect to FIGS. 4 and 5.

Additionally, mobile drive units 20 may be capable of communicating with management module 15 to receive information identifying selected inventory holders 30, transmit the locations of mobile drive units 20, or exchange any other suitable information to be used by management module 15 or mobile drive units 20 during operation. Mobile drive units 20 may communicate with management module 15 wirelessly, using wired connections between mobile drive units 20 and management module 15, and/or in any other appropriate manner. As one example, particular embodiments of mobile drive unit 20 may communicate with management module 15 and/or with one another using 802.11, Bluetooth, or Infrared Data Association (IrDA) standards, or any other appropriate wireless communication protocol. As another example, in a tracked inventory system 10, tracks or other guidance elements upon which mobile drive units 20 move may be wired to facilitate communication between mobile drive units 20 and other components of inventory system 10. Furthermore, as noted above, management module 15 may include components of individual mobile drive units 20. Thus, for the purposes of this description and the claims that follow, communication between management module 15 and a particular mobile drive unit 20 may represent communication between components of a particular mobile drive unit 20. In general, mobile drive units 20 may be powered, propelled, and controlled in any manner appropriate based on the configuration and characteristics of inventory system 10.

Inventory holders 30 store inventory items. In a particular embodiment, inventory holders 30 include multiple storage bins with each storage bin capable of holding one or more types of inventory items. Inventory holders 30 are capable of being carried, rolled, and/or otherwise moved by mobile drive units 20. In particular embodiments, inventory holder 30 may provide additional propulsion to supplement that provided by mobile drive unit 20 when moving inventory holder 30.

Additionally, in particular embodiments, inventory items 40 may also hang from hooks or bars (not shown) within or on inventory holder 30. In general, inventory holder 30 may store inventory items 40 in any appropriate manner within inventory holder 30 and/or on the external surface of inventory holder 30.

Additionally, each inventory holder 30 may include a plurality of faces, and each bin may be accessible through one or more faces of the inventory holder 30. For example, in a particular embodiment, inventory holder 30 includes four faces. In such an embodiment, bins located at a corner of two faces may be accessible through either of those two faces, while each of the other bins is accessible through an opening in one of the four faces. Mobile drive unit 20 may be configured to rotate inventory holder 30 at appropriate times to present a particular face and the bins associated with that face to an operator or other components of inventory system 10.

Inventory items represent any objects suitable for storage, retrieval, and/or processing in an automated inventory system 10. For the purposes of this description, "inventory items" may represent any one or more objects of a particular type that are stored in inventory system 10. Thus, a particular inventory holder 30 is currently "storing" a particular inventory item if the inventory holder 30 currently holds one or more units of that type. As one example, inventory system 10 may represent a mail order warehouse facility, and inventory items may represent merchandise stored in the warehouse facility. During operation, mobile drive units 20 may retrieve inventory holders 30 containing one or more inventory items requested in an order to be packed for delivery to a customer or inventory holders 30 carrying pallets containing aggregated collections of inventory items for shipment. Moreover, in particular embodiments of inventory system 10, boxes containing completed orders may themselves represent inventory items.

In particular embodiments, inventory system 10 may also include one or more inventory stations 50. Inventory stations 50 represent locations designated for the completion of particular tasks involving inventory items. Such tasks may include the removal of inventory items from inventory holders 30, the introduction of inventory items into inventory holders 30, the counting of inventory items in inventory holders 30, the decomposition of inventory items (e.g. from pallet- or case-sized groups to individual inventory items), the consolidation of inventory items between inventory holders 30, and/or the processing or handling of inventory items in any other suitable manner. In particular embodiments, inventory stations 50 may just represent the physical locations where a particular task involving inventory items can be completed within workspace 70. In alternative embodiments, inventory stations 50 may represent both the physical location and also any appropriate equipment for processing or handling inventory items, such as scanners for monitoring the flow of inventory items in and out of inventory system 10, communication interfaces for communicating with management module 15, and/or any other suitable components. Inventory stations 50 may be controlled, entirely or in part, by human operators or may be fully automated. Moreover, the human or automated operators of inventory stations 50 may be capable of performing certain tasks to inventory items, such as packing, counting, or transferring inventory items, as part of the operation of inventory system 10.

Workspace 70 represents an area associated with inventory system 10 in which mobile drive units 20 can move and/or inventory holders 30 can be stored. For example, workspace 70 may represent all or part of the floor of a mail-order warehouse in which inventory system 10 operates. Although FIG. 2 shows, for the purposes of illustration, an embodiment of inventory system 10 in which workspace 70 includes a fixed, predetermined, and finite physical space, particular embodiments of inventory system 10 may include mobile drive units 20 and inventory holders 30 that are configured to operate within a workspace 70 that is of variable dimensions and/or an arbitrary geometry. While FIG. 2 illustrates a particular embodiment of inventory system 10 in which workspace 70 is entirely enclosed in a building, alternative embodiments may utilize workspaces 70 in which some or all of the workspace 70 is located outdoors, within a vehicle (such as a cargo ship), or otherwise unconstrained by any fixed structure.

In operation, management module 15 selects appropriate components to complete particular tasks and transmits task assignments 18 to the selected components to trigger completion of the relevant tasks. Each task assignment 18 defines one or more tasks to be completed by a particular component. These tasks may relate to the retrieval, storage, replenishment, and counting of inventory items and/or the management of mobile drive units 20, inventory holders 30, inventory stations 50 and other components of inventory system 10. Depending on the component and the task to be completed, a particular task assignment 18 may identify locations, components, and/or actions associated with the corresponding task and/or any other appropriate information to be used by the relevant component in completing the assigned task.

In particular embodiments, management module 15 generates task assignments 18 based, in part, on inventory requests that management module 15 receives from other components of inventory system 10 and/or from external components in communication with management module 15. These inventory requests identify particular operations to be completed involving inventory items stored or to be stored within inventory system 10 and may represent communication of any suitable form. For example, in particular embodiments, an inventory request may represent a shipping order specifying particular inventory items that have been purchased by a customer and that are to be retrieved from inventory system 10 for shipment to the customer. Management module 15 may also generate task assignments 18 independently of such inventory requests, as part of the overall management and maintenance of inventory system 10. For example, management module 15 may generate task assignments 18 in response to the occurrence of a particular event (e.g., in response to a mobile drive unit 20 requesting a space to park), according to a predetermined schedule (e.g., as part of a daily start-up routine), or at any appropriate time based on the configuration and characteristics of inventory system 10. After generating one or more task assignments 18, management module 15 transmits the generated task assignments 18 to appropriate components for completion of the corresponding task. The relevant components then execute their assigned tasks.

With respect to mobile drive units 20 specifically, management module 15 may, in particular embodiments, communicate task assignments 18 to selected mobile drive units 20 that identify one or more destinations for the selected mobile drive units 20. Management module 15 may select a mobile drive unit 20 to assign the relevant task based on the location or state of the selected mobile drive unit 20, an indication that the selected mobile drive unit 20 has completed a previously-assigned task, a predetermined schedule, and/or any other suitable consideration. These destinations may be associated with an inventory request the management module 15 is executing or a management objective the management module 15 is attempting to fulfill. For example, the task assignment may define the location of an inventory holder 30 to be retrieved, an inventory station 50 to be visited, a storage location where the mobile drive unit 20 should park until receiving another task, or a location associated with any other task appropriate based on the configuration, characteristics, and/or state of inventory system 10, as a whole, or individual components of inventory system 10. For example, in particular embodiments, such decisions may be based on the popularity of particular inventory items, the staffing of a particular inventory station 50, the tasks currently assigned to a particular mobile drive unit 20, and/or any other appropriate considerations.

As part of completing these tasks mobile drive units 20 may dock with and transport inventory holders 30 within workspace 70. Mobile drive units 20 may dock with inventory holders 30 by connecting to, lifting, and/or otherwise interacting with inventory holders 30 in any other suitable manner so that, when docked, mobile drive units 20 are coupled to and/or support inventory holders 30 and can move inventory holders 30 within workspace 70. While the description below focuses on particular embodiments of mobile drive unit 20 and inventory holder 30 that are configured to dock in a particular manner, alternative embodiments of mobile drive unit 20 and inventory holder 30 may be configured to dock in any manner suitable to allow mobile drive unit 20 to move inventory holder 30 within workspace 70. Additionally, as noted below, in particular embodiments, mobile drive units 20 represent all or portions of inventory holders 30. In such embodiments, mobile drive units 20 may not dock with inventory holders 30 before transporting inventory holders 30 and/or mobile drive units 20 may each remain continually docked with a particular inventory holder 30.

While the appropriate components of inventory system 10 complete assigned tasks, management module 15 may interact with the relevant components to ensure the efficient use of space, equipment, manpower, and other resources available to inventory system 10. As one specific example of such interaction, management module 15 is responsible, in particular embodiments, for planning the paths mobile drive units 20 take when moving within workspace 70 and for allocating use of a particular portion of workspace 70 to a particular mobile drive unit 20 for purposes of completing an assigned task. In such embodiments, mobile drive units 20 may, in response to being assigned a task, request a path to a particular destination associated with the task. Moreover, while the description below focuses on one or more embodiments in which mobile drive unit 20 requests paths from management module 15, mobile drive unit 20 may, in alternative embodiments, generate its own paths.

Components of inventory system 10 may provide information to management module 15 regarding their current state, other components of inventory system 10 with which they are interacting, and/or other conditions relevant to the operation of inventory system 10. This may allow management module 15 to utilize feedback from the relevant components to update algorithm parameters, adjust policies, or otherwise modify its decision-making to respond to changes in operating conditions or the occurrence of particular events.

In addition, while management module 15 may be configured to manage various aspects of the operation of the components of inventory system 10, in particular embodiments, the components themselves may also be responsible for decision-making relating to certain aspects of their operation, thereby reducing the processing load on management module 15.

Thus, based on its knowledge of the location, current state, and/or other characteristics of the various components of inventory system 10 and an awareness of all the tasks currently being completed, management module 15 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory system 10 may be able to support a number of techniques for efficiently executing various aspects of the operation of inventory system 10. As a result, particular embodiments of management module 15 may, by implementing one or more management techniques described below, enhance the efficiency of inventory system 10 and/or provide other operational benefits.

Figure 3:
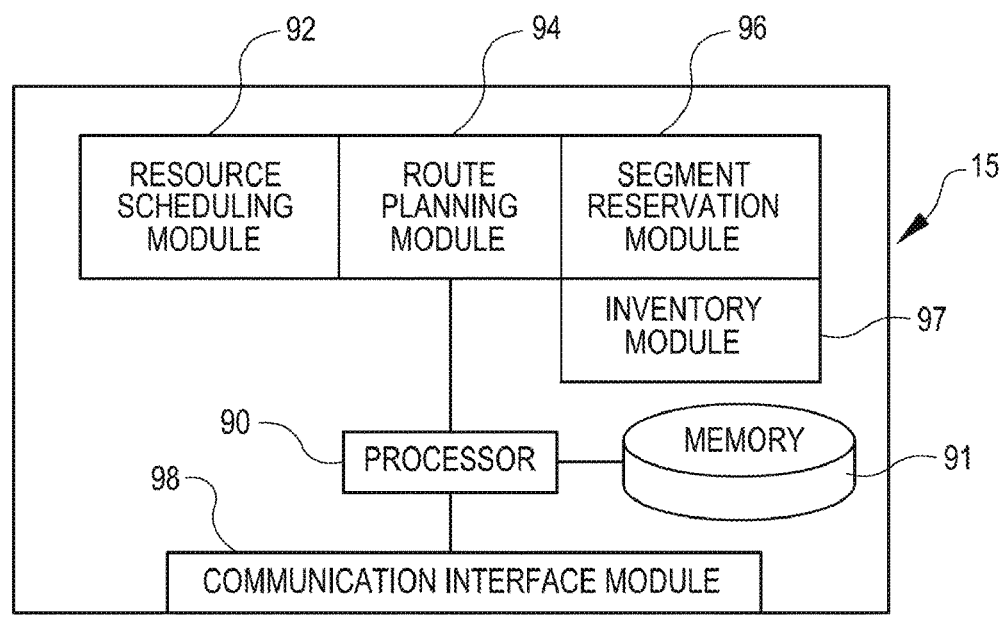
FIG. 3 illustrates components of an example management module that can be used in particular embodiments of the inventory system shown in FIG. 2.

FIG. 3 illustrates in greater detail the components of a particular embodiment of management module 15. As shown, the example embodiment includes a resource scheduling module 92, a route planning module 94, a segment reservation module 96, an inventory module 97, a communication interface module 98, a processor 90, and a memory 91. Management module 15 may represent a single component, multiple components located at a central location within inventory system 10, or multiple components distributed throughout inventory system 10. For example, management module 15 may represent components of one or more mobile drive units 20 that are capable of communicating information between the mobile drive units 20 and coordinating the movement of mobile drive units 20 within workspace 70. In general, management module 15 may include any appropriate combination of hardware and/or software suitable to provide the described functionality.

Processor 90 is operable to execute instructions associated with the functionality provided by management module 15. Processor 90 may comprise one or more general purpose computers, dedicated microprocessors, or other processing devices capable of communicating electronic information. Examples of processor 90 include one or more application-specific integrated circuits (ASICs), field programmable gate arrays (FPGAs), digital signal processors (DSPs) and any other suitable specific or general purpose processors.

Memory 91 stores processor instructions, inventory requests, reservation information, state information for the various components of inventory system 10 and/or any other appropriate values, parameters, or information used by management module 15 during operation. Memory 91 may represent any collection and arrangement of volatile or nonvolatile, local or remote devices suitable for storing data.

Examples of memory 91 include, but are not limited to, random access memory (RAM) devices, read only memory (ROM) devices, magnetic storage devices, optical storage devices or any other suitable data storage devices.

Resource scheduling module 92 processes received inventory requests and generates one or more assigned tasks to be completed by the components of inventory system 10. Resource scheduling module 92 may also select one or more appropriate components for completing the assigned tasks and, using communication interface module 98, communicate the assigned tasks to the relevant components. Additionally, resource scheduling module 92 may also be responsible for generating assigned tasks associated with various management operations, such as prompting mobile drive units 20 to recharge batteries or have batteries replaced, instructing inactive mobile drive units 20 to park in a location outside the anticipated traffic flow or a location near the anticipated site of future tasks, and/or directing mobile drive units 20 selected for repair or maintenance to move towards a designated maintenance station.

Route planning module 94 receives route requests from mobile drive units 20. These route requests identify one or more destinations associated with a task the requesting mobile drive unit 20 is executing. In response to receiving a route request, route planning module 94 generates a path to one or more destinations identified in the route request. Route planning module 94 may implement any appropriate algorithms utilizing any appropriate parameters, factors, and/or considerations to determine the appropriate path. After generating an appropriate path, route planning module 94 transmits a route response identifying the generated path to the requesting mobile drive unit 20 using communication interface module 98.

Segment reservation module 96 receives reservation requests from mobile drive units 20 attempting to move along paths generated by route planning module 94. These reservation requests request the use of a particular portion of workspace 70 (referred to herein as a "segment") to allow the requesting mobile drive unit 20 to avoid collisions with other mobile drive units 20 while moving across the reserved segment. In response to received reservation requests, segment reservation module 96 transmits a reservation response granting or denying the reservation request to the requesting mobile drive unit 20 using the communication interface module 98.

The inventory module 97 maintains information about the location and number of inventory items 40 in the inventory system 10. Information can be maintained about the number of inventory items 40 in a particular inventory holder 30, and the maintained information can include the location of those inventory items 40 in the inventory holder 30. The inventory module 97 can also communicate with the mobile drive units 20, utilizing task assignments 18 to maintain, replenish or move inventory items 40 within the inventory system 10.

Communication interface module 98 facilitates communication between management module 15 and other components of inventory system 10, including reservation responses, reservation requests, route requests, route responses, and task assignments. These reservation responses, reservation requests, route requests, route responses, and task assignments may represent communication of any form appropriate based on the capabilities of management module 15 and may include any suitable information. Depending on the configuration of management module 15, communication interface module 98 may be responsible for facilitating either or both of wired and wireless communication between management module 15 and the various components of inventory system 10. In particular embodiments, management module 15 may communicate using communication protocols such as 802.11, Bluetooth, or Infrared Data Association (IrDA) standards. Furthermore, management module 15 may, in particular embodiments, represent a portion of mobile drive unit 20 or other components of inventory system 10. In such embodiments, communication interface module 98 may facilitate communication between management module 15 and other parts of the same system component.

In general, resource scheduling module 92, route planning module 94, segment reservation module 96, inventory module 97, and communication interface module 98 may each represent any appropriate hardware and/or software suitable to provide the described functionality. In addition, as noted above, management module 15 may, in particular embodiments, represent multiple different discrete components and any or all of resource scheduling module 92, route planning module 94, segment reservation module 96, inventory module 97, and communication interface module 98 may represent components physically separate from the remaining elements of management module 15. Moreover, any two or more of resource scheduling module 92, route planning module 94, segment reservation module 96, inventory module 97, and communication interface module 98 may share common components. For example, in particular embodiments, resource scheduling module 92, route planning module 94, segment reservation module 96, and inventory module 97 represent computer processes executing on processor 90 and communication interface module 98 comprises a wireless transmitter, a wireless receiver, and a related computer process executing on processor 90.

Figure 4:
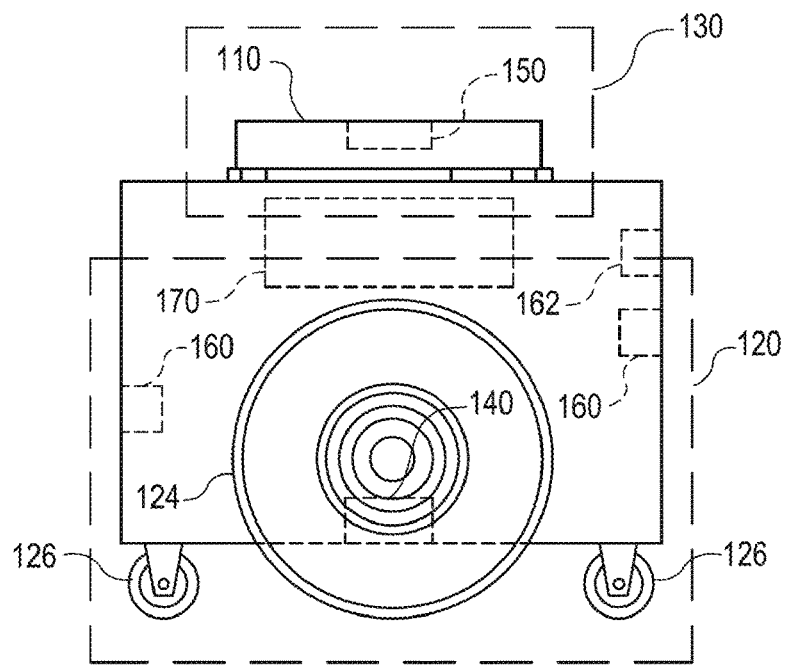
FIGS. 4 and 5 illustrate an example mobile drive unit that can be used in particular embodiments of the inventory system shown in FIG. 2.
Figure 5:
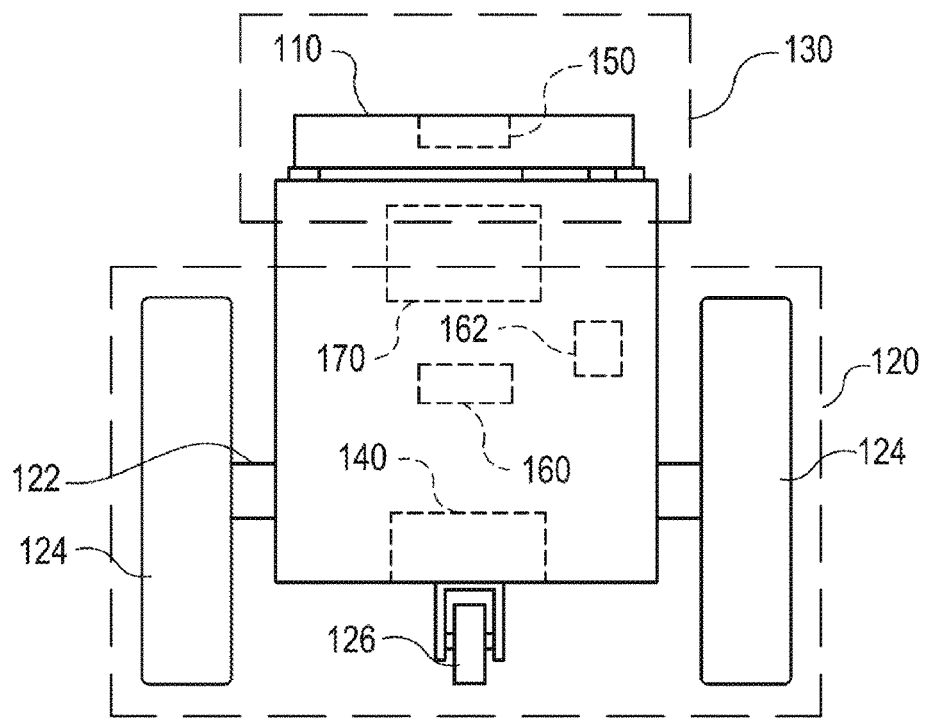

FIGS. 4 and 5 illustrate in greater detail the components of a particular embodiment of mobile drive unit 20. In particular, FIGS. 4 and 5 include a front and side view of an example mobile drive unit 20. Mobile drive unit 20 includes a docking head 110, a drive module 120, a docking actuator 130, and a control module 170. Additionally, mobile drive unit 20 may include one or more sensors configured to detect or determine the location of mobile drive unit 20, inventory holder 30, and/or other appropriate elements of inventory system 10. In the illustrated embodiment, mobile drive unit 20 includes a position sensor 140, a holder sensor 150, an obstacle sensor 160, and an identification signal transmitter 162.

Docking head 110, in particular embodiments of mobile drive unit 20, couples mobile drive unit 20 to inventory holder 30 and/or supports inventory holder 30 when mobile drive unit 20 is docked to inventory holder 30. Docking head 110 may additionally allow mobile drive unit 20 to maneuver inventory holder 30, such as by lifting inventory holder 30, propelling inventory holder 30, rotating inventory holder 30, and/or moving inventory holder 30 in any other appropriate manner. Docking head 110 may also include any appropriate combination of components, such as ribs, spikes, and/or corrugations, to facilitate such manipulation of inventory holder 30. For example, in particular embodiments, docking head 110 may include a high-friction portion that abuts a portion of inventory holder 30 while mobile drive unit 20 is docked to inventory holder 30. In such embodiments, frictional forces created between the high-friction portion of docking head 110 and a surface of inventory holder 30 may induce translational and rotational movement in inventory holder 30 when docking head 110 moves and rotates, respectively. As a result, mobile drive unit 20 may be able to manipulate inventory holder 30 by moving or rotating docking head 110, either independently or as a part of the movement of mobile drive unit 20 as a whole.

Drive module 120 propels mobile drive unit 20 and, when mobile drive unit 20 and inventory holder 30 are docked, inventory holder 30. Drive module 120 may represent any appropriate collection of components operable to propel mobile drive unit 20. For example, in the illustrated embodiment, drive module 120 includes motorized axle 122, a pair of motorized wheels 124, and a pair of stabilizing wheels 126. One motorized wheel 124 is located at each end of motorized axle 122, and one stabilizing wheel 126 is positioned at each end of mobile drive unit 20.

Docking actuator 130 moves docking head 110 towards inventory holder 30 to facilitate docking of mobile drive unit 20 and inventory holder 30. Docking actuator 130 may also be capable of adjusting the position or orientation of docking head 110 in other suitable manners to facilitate docking. Docking actuator 130 may include any appropriate components, based on the configuration of mobile drive unit 20 and inventory holder 30, for moving docking head 110 or otherwise adjusting the position or orientation of docking head 110. For example, in the illustrated embodiment, docking actuator 130 includes a motorized shaft (not shown) attached to the center of docking head 110. The motorized shaft is operable to lift docking head 110 as appropriate for docking with inventory holder 30.

Drive module 120 may be configured to propel mobile drive unit 20 in any appropriate manner. For example, in the illustrated embodiment, motorized wheels 124 are operable to rotate in a first direction to propel mobile drive unit 20 in a forward direction. Motorized wheels 124 are also operable to rotate in a second direction to propel mobile drive unit 20 in a backward direction. In the illustrated embodiment, drive module 120 is also configured to rotate mobile drive unit 20 by rotating motorized wheels 124 in different directions from one another or by rotating motorized wheels 124 at different speeds from one another.

Position sensor 140 represents one or more sensors, detectors, or other components suitable for determining the location of mobile drive unit 20 in any appropriate manner. For example, in particular embodiments, the workspace 70 associated with inventory system 10 includes a number of fiducial marks that mark points on a two-dimensional grid that covers all or a portion of workspace 70. In such embodiments, position sensor 140 may include a camera and suitable image- and/or video-processing components, such as an appropriately-programmed digital signal processor, to allow position sensor 140 to detect fiducial marks within the camera's field of view. Control module 170 may store location information that position sensor 140 updates as position sensor 140 detects fiducial marks. As a result, position sensor 140 may utilize fiducial marks to maintain an accurate indication of the location mobile drive unit 20 and to aid in navigation when moving within workspace 70.

Holder sensor 150 represents one or more sensors, detectors, or other components suitable for detecting inventory holder 30 and/or determining, in any appropriate manner, the location of inventory holder 30, as an absolute location or as a position relative to mobile drive unit 20. Holder sensor 150 may be capable of detecting the location of a particular portion of inventory holder 30 or inventory holder 30 as a whole. Mobile drive unit 20 may then use the detected information for docking with or otherwise interacting with inventory holder 30.

Obstacle sensor 160 represents one or more sensors capable of detecting objects located in one or more different directions in which mobile drive unit 20 is capable of moving. Obstacle sensor 160 may utilize any appropriate components and techniques, including optical, radar, sonar, pressure-sensing and/or other types of detection devices appropriate to detect objects located in the direction of travel of mobile drive unit 20. In particular embodiments, obstacle sensor 160 may transmit information describing objects it detects to control module 170 to be used by control module 170 to identify obstacles and to take appropriate remedial actions to prevent mobile drive unit 20 from colliding with obstacles and/or other objects.

Obstacle sensor 160 may also detect signals transmitted by other mobile drive units 20 operating in the vicinity of the illustrated mobile drive unit 20. For example, in particular embodiments of inventory system 10, one or more mobile drive units 20 may include an identification signal transmitter 162 that transmits a drive identification signal. The drive identification signal indicates to other mobile drive units 20 that the object transmitting the drive identification signal is in fact a mobile drive unit. Identification signal transmitter 162 may be capable of transmitting infrared, ultraviolet, audio, visible light, radio, and/or other suitable signals that indicate to recipients that the transmitting device is a mobile drive unit 20.

Additionally, in particular embodiments, obstacle sensor 160 may also be capable of detecting state information transmitted by other mobile drive units 20. For example, in particular embodiments, identification signal transmitter 162 may be capable of including state information relating to mobile drive unit 20 in the transmitted identification signal. This state information may include, but is not limited to, the position, velocity, direction, and the braking capabilities of the transmitting mobile drive unit 20. In particular embodiments, mobile drive unit 20 may use the state information transmitted by other mobile drive units to avoid collisions when operating in close proximity with those other mobile drive units.

Control module 170 monitors and/or controls operation of drive module 120 and docking actuator 130. Control module 170 may also receive information from sensors such as position sensor 140 and holder sensor 150 and adjust the operation of drive module 120, docking actuator 130, and/or other components of mobile drive unit 20 based on this information. Additionally, in particular embodiments, mobile drive unit 20 may be configured to communicate with a management device of inventory system 10 and control module 170 may receive commands transmitted to mobile drive unit 20 and communicate information back to the management device utilizing appropriate communication components of mobile drive unit 20. Control module 170 may include any appropriate hardware and/or software suitable to provide the described functionality. In particular embodiments, control module 170 includes a general-purpose microprocessor programmed to provide the described functionality. Additionally, control module 170 may include all or portions of docking actuator 130, drive module 120, position sensor 140, and/or holder sensor 150, and/or share components with any of these elements of mobile drive unit 20.

Moreover, in particular embodiments, control module 170 may include hardware and software located in components that are physically distinct from the device that houses drive module 120, docking actuator 130, and/or the other components of mobile drive unit 20 described above. For example, in particular embodiments, each mobile drive unit 20 operating in inventory system 10 may be associated with a software process (referred to here as a "drive agent")

operating on a server that is in communication with the device that houses drive module 120, docking actuator 130, and other appropriate components of mobile drive unit 20. This drive agent may be responsible for requesting and receiving tasks, requesting and receiving routes, transmitting state information associated with mobile drive unit 20, and/or otherwise interacting with management module 15 and other components of inventory system 10 on behalf of the device that physically houses drive module 120, docking actuator 130, and the other appropriate components of mobile drive unit 20. As a result, for the purposes of this description and the claims that follow, the term "mobile drive unit" includes software and/or hardware, such as agent processes, that provides the described functionality on behalf of mobile drive unit 20 but that may be located in physically distinct devices from the drive module 120, docking actuator 130, and/or the other components of mobile drive unit 20 described above.

While FIGS. 4 and 5 illustrate a particular embodiment of mobile drive unit 20 containing certain components and configured to operate in a particular manner, mobile drive unit 20 may represent any appropriate component and/or collection of components configured to transport and/or facilitate the transport of inventory holders 30. As another example, mobile drive unit 20 may represent part of an overhead crane system in which one or more crane assemblies are capable of moving within a network of wires or rails to a position suitable to dock with a particular inventory holder 30. After docking with inventory holder 30, the crane assembly may then lift inventory holder 30 and move inventory to another location for purposes of completing an assigned task.

Furthermore, in particular embodiments, mobile drive unit 20 may represent all or a portion of inventory holder 30. Inventory holder 30 may include motorized wheels or any other components suitable to allow inventory holder 30 to propel itself. As one specific example, a portion of inventory holder 30 may be responsive to magnetic fields. Inventory system 10 may be able to generate one or more controlled magnetic fields capable of propelling, maneuvering and/or otherwise controlling the position of inventory holder 30 as a result of the responsive portion of inventory holder 30. In such embodiments, mobile drive unit 20 may represent the responsive portion of inventory holder 30 and/or the components of inventory system 10 responsible for generating and controlling these magnetic fields. While this description provides several specific examples, mobile drive unit 20 may, in general, represent any appropriate component and/or collection of components configured to transport and/or facilitate the transport of inventory holders 30.

Figure 6:
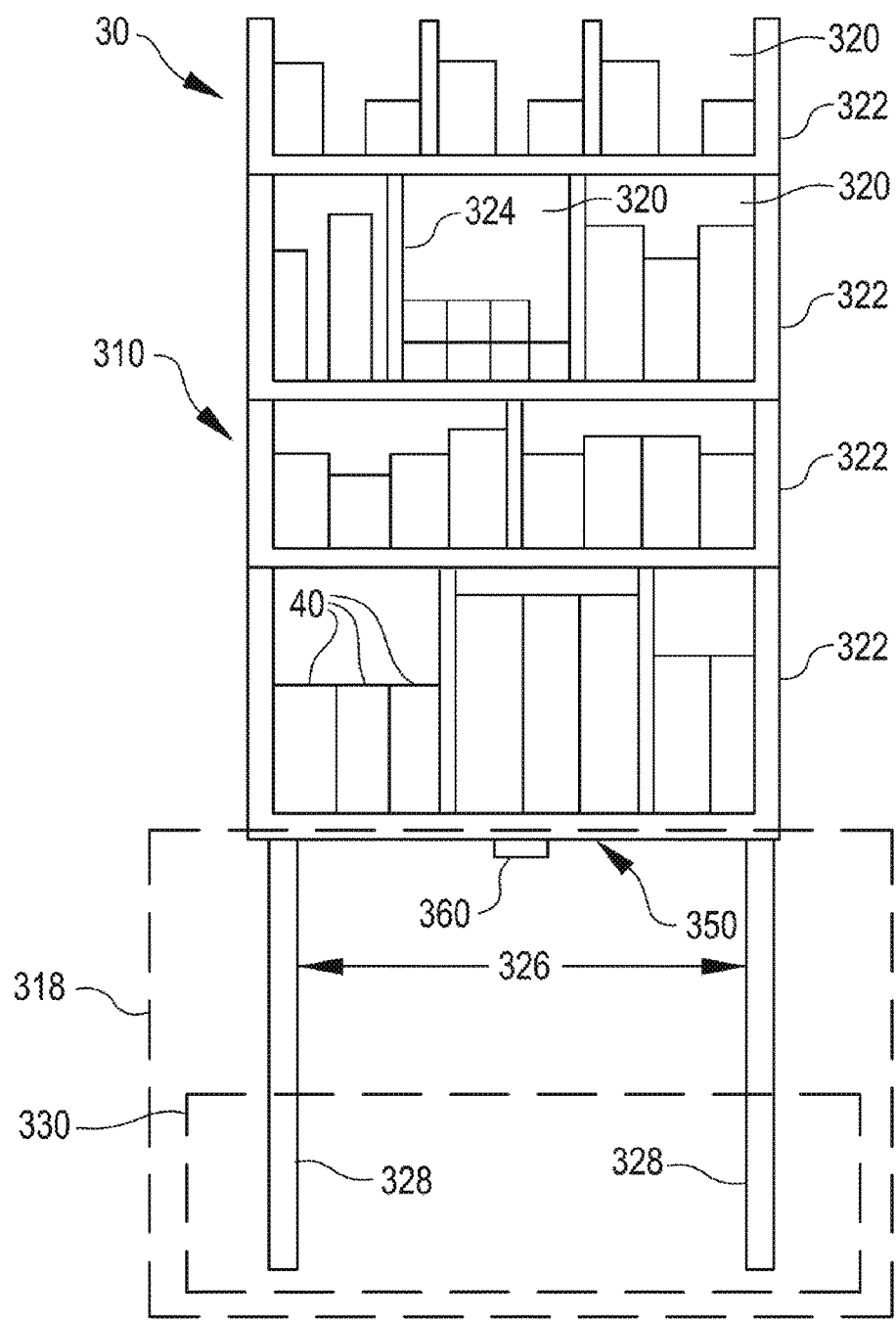
FIG. 6 illustrates an example inventory holder that can be used in particular embodiments of the inventory system shown in FIG. 2.

FIG. 6 illustrates in greater detail the components of a particular embodiment of inventory holder 30. In particular, FIG. 6 illustrates the structure and contents of one side of an example inventory holder 30. In a particular embodiment, inventory holder 30 may comprise any number of faces with similar or different structure. As illustrated, inventory holder 30 includes a frame 310, a plurality of legs 328, and a docking surface 350.

Frame 310 holds inventory items 40. Frame 310 provides storage space for storing inventory items 40 external or internal to frame 310. The storage space provided by frame 310 may be divided into a plurality of inventory bins 320, each capable of holding inventory items 40. Inventory bins 320 may include any appropriate storage elements, such as bins, compartments, or hooks.

In a particular embodiment, frame 310 is composed of a plurality of trays 322 stacked upon one another and attached to or stacked on a base 318. In such an embodiment, inventory bins 320 may be formed by a plurality of adjustable dividers 324 that may be moved to resize one or more inventory bins 320. In alternative embodiments, frame 310 may represent a single inventory bin 320 that includes a single tray 322 and no adjustable dividers 324. Additionally, in particular embodiments, frame 310 may represent a load-bearing surface mounted on mobility element 330. Inventory items 40 may be stored on such an inventory holder 30 by being placed on frame 310. In general, frame 310 may include internal and/or external storage space divided into any appropriate number of inventory bins 320 in any appropriate manner.

Additionally, in a particular embodiment, frame 310 may include a plurality of device openings 326 that allow mobile drive unit 20 to position docking head 110 adjacent docking surface 350. The size, shape, and placement of device openings 326 may be determined based on the size, the shape, and other characteristics of the particular embodiment of mobile drive unit 20 and/or inventory holder 30 used by inventory system 10. For example, in the illustrated embodiment, frame 310 includes four legs 328 that form device openings 326 and allow mobile drive unit 20 to position mobile drive unit 20 under frame 310 and adjacent to docking surface 350. The length of legs 328 may be determined based on a height of mobile drive unit 20.

Docking surface 350 comprises a portion of inventory holder 30 that couples to, abuts, and/or rests upon a portion of docking head 110, when mobile drive unit 20 is docked to inventory holder 30. Additionally, docking surface 350 supports a portion or all of the weight of inventory holder 30 while inventory holder 30 is docked with mobile drive unit 20. The composition, shape, and/or texture of docking surface 350 may be designed to facilitate maneuvering of inventory holder 30 by mobile drive unit 20. For example, as noted above, in particular embodiments, docking surface 350 may comprise a high-friction portion. When mobile drive unit 20 and inventory holder 30 are docked, frictional forces induced between docking head 110 and this high-friction portion may allow mobile drive unit 20 to maneuver inventory holder 30. Additionally, in particular embodiments, docking surface 350 may include appropriate components suitable to receive a portion of docking head 110, couple inventory holder 30 to mobile drive unit 20, and/or facilitate control of inventory holder 30 by mobile drive unit 20.

Holder identifier 360 marks a predetermined portion of inventory holder 30 and mobile drive unit 20 may use holder identifier 360 to align with inventory holder 30 during docking and/or to determine the location of inventory holder 30. More specifically, in particular embodiments, mobile drive unit 20 may be equipped with components, such as holder sensor 150, that can detect holder identifier 360 and determine its location relative to mobile drive unit 20. As a result, mobile drive unit 20 may be able to determine the location of inventory holder 30 as a whole. For example, in particular embodiments, holder identifier 360 may represent a reflective marker that is positioned at a predetermined location on inventory holder 30 and that holder sensor 150 can optically detect using an appropriately-configured camera.

Depending on the configuration and characteristics of mobile drive unit 20 and inventory system 10, mobile drive unit 20 may move inventory holder 30 using a variety of appropriate methods. In a particular embodiment, mobile drive unit 20 is capable of moving inventory holder 30 along a two-dimensional grid, combining movement along straight-line segments with ninety-degree rotations and arcing paths to transport inventory holder 30 from the first location to the second location. Additionally, while moving, mobile drive unit 20 may use fixed objects located in the workspace as reference points to assist in navigation. For example, in particular embodiments, inventory system 10 includes multiple fiducial marks. Mobile drive unit 20 may be configured to detect fiducial marks and to determine the location of mobile drive unit 20 and/or measure its movement based on the detection of fiducial marks.

After mobile drive unit 20 arrives at the second location, mobile drive unit 20 may perform appropriate operations to facilitate access to inventory items 40 stored in inventory holder 30. For example, mobile drive unit 20 may rotate inventory holder 30 to present a particular face of inventory holder 30 to an operator of inventory system 10 or other suitable party, such as a packer selecting inventory items 40 from inventory holder 30. Mobile drive unit 20 may also undock from inventory holder 30. Alternatively, instead of undocking at the second location, mobile drive unit 20 may transport inventory holder 30 back to the first location or to a third location after any appropriate actions have been taken involving inventory items 40. For example, after a packer has removed particular inventory items 40 from inventory holder 30, mobile drive unit 20 may return inventory holder 30 to its original storage location, a new storage location, or another inventory station. Mobile drive unit 20 may then undock from inventory holder 30 at this new location.

As described herein, embodiments described herein are directed to self-illuminating inventory management containers, as well as systems and methods of using the self-illuminating containers in an inventory system. For example, the inventory manager 112 (FIG. 1) can be configured to communicate with an inventory management container at various locations in an inventory system 10 (FIG. 2) as described above, and in accordance with embodiments described below.

Figure 7:
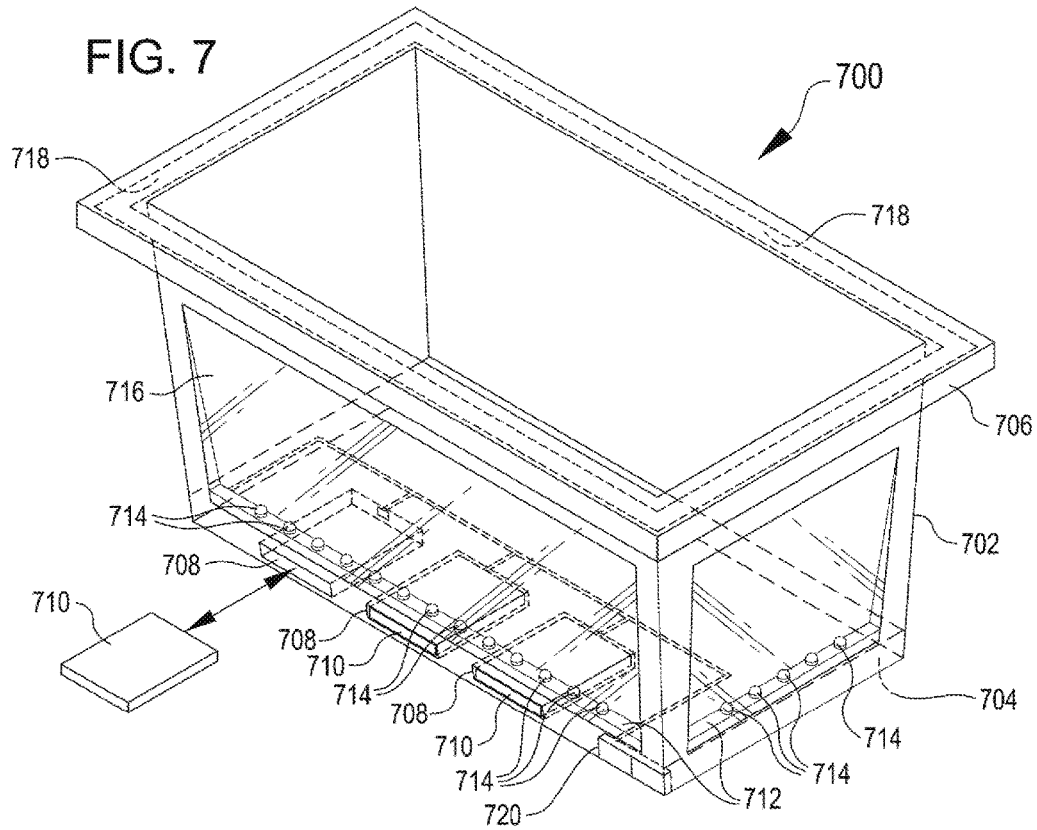
FIG. 7 illustrates an inventory management container for use in an inventory system in accordance with embodiments.

FIG. 7 illustrates a self-illuminating inventory management container 700 for use in an inventory system, in accordance with embodiments. The inventory management container 700 is preferably a durable container or tote for transporting items, and can be predominantly formed from any suitable material (e.g., a rigid polymer and/or metal). Each inventory management container 700 includes sidewalls 702, a base 704, and a top 706, which can include a lip configured for manual handling of the inventory management container 700. In some embodiments, the sidewalls 702 include a translucent and/or transparent sidewall surface 716 that is capable of transferring, shining, and/or reflecting light. In some embodiments, the sidewall surface 716 is a coating, covering, film, or additional panel that is added to the sidewall 702. In some embodiments, the sidewall surface 716 is a reflective surface of the sidewall 702 which may be set at a different angle than the sidewall 702. The sidewall surface 716 can be a region of the sidewall 702 in embodiments where the material of the sidewall 702 is entirely or substantially composed of a translucent and/or transparent material that can transmit and shine light. In some embodiments, the sidewall surface 716, or the sidewall 702, can be formed of or can include a light emitting or a fluorescent material, coating, or surface treatment that is capable of reemitting light.

Figure 9:
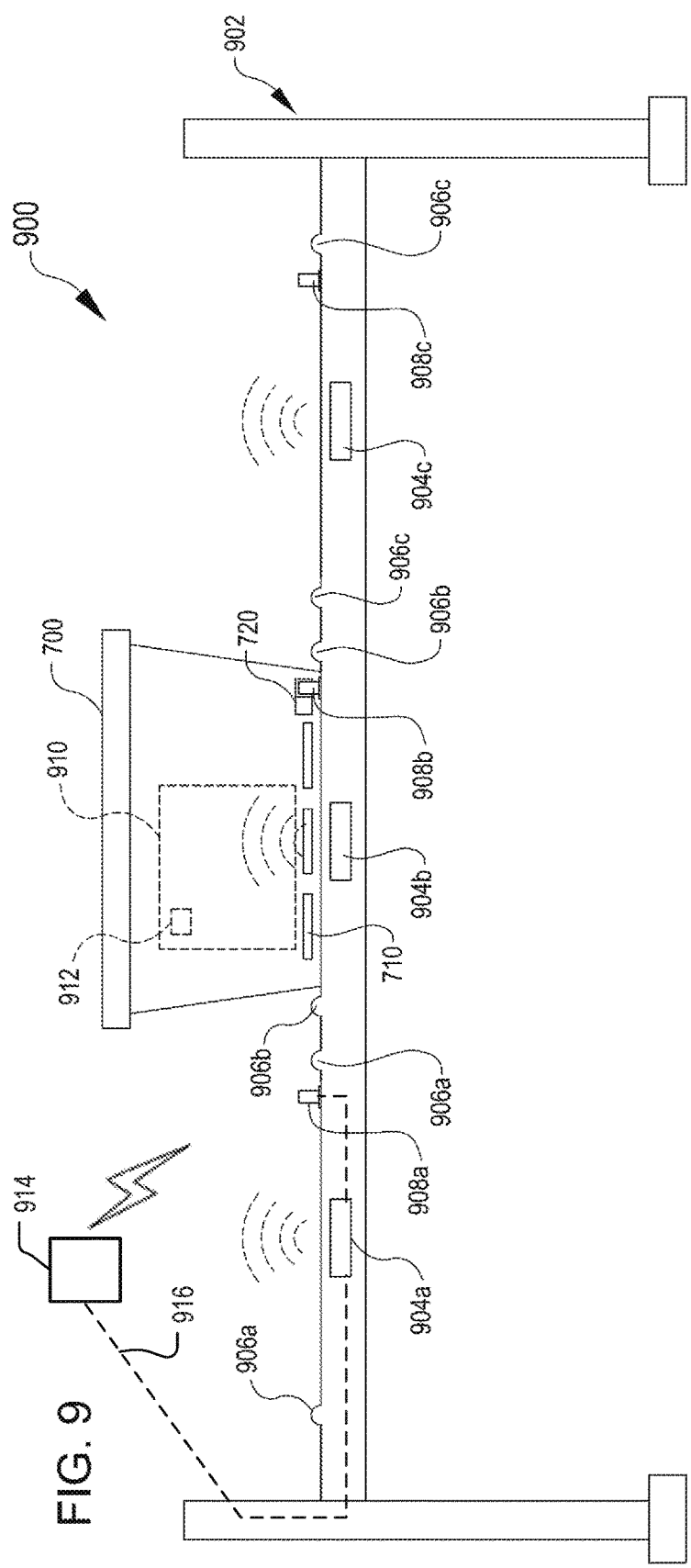
FIG. 9 illustrates an inventory management rack in accordance with embodiments.

The inventory management container 700 can also include a plurality of voids or slots 708 for receiving signal receivers such as wireless-enabled cards 710 (analogous to the wireless-enabled cards 121 of FIG. 1). The wireless-enabled cards 710 can store information about the particular inventory management container 700 that can include an identity, contents, expected contents, and/or an illumination status (e.g. on/off, or an illumination mode). The wireless-enabled cards 710 can be hot-swappable, semi-permanent, or permanent, and may be attached with the inventory management container 700 via a manually-operable spring device, may be attached via screws, bolts, adhesive, or other attachment means, may be embedded, or may be attached with the inventory management container 700 via other suitable attachment means. In some embodiments, multiple wireless-enabled cards 710 can be removably inserted into the slots 708, which may be substantially identical such that the wireless-enabled cards 710 are easily replaced and/or interchanged. The wireless-enabled cards 710 can be electrically connectible to a contact element 720 of the inventory management container 700, where the contact element 720 is capable of interfacing with a matching contact element of, for example, an container platform 908 (FIG. 9). The contact element 720 can include a data connection for transferring data, a power connection for supplying electrical power to components of the inventory management container 700, or both. The wireless-enabled cards 710 can also be electrically connectible to a lighting element 712 which can include any suitable light source, such as a plurality of discrete light sources 714, which can be LEDs. In some embodiments, each wireless-enabled card 710 can be configured to operate a different illumination mode at the lighting element 712, e.g. by each connecting to a different electrical pathway to a subset of light sources 714, by containing stored instructions in a memory to activate the lighting element 712 in a particular mode, or other suitable means. In some embodiments, three wireless-enabled cards 710 may be provided as illustrated in FIG. 7, but in other cases, one, two, four, or any other suitable number of wireless-enabled cards 710 may be provided in any suitable number of slots 708. In some embodiments, a number of wireless-enabled cards may correspond to a number of distinct illumination modes, e.g. colors of illumination. In some embodiments, two or more wireless-enabled cards 710 can control the same illumination mode, e.g. by being connectible to the same electrical pathway, or by containing the same stored instructions, such that said two or more wireless-enabled cards 710 act as backups for one another.

When instructions are received at a wireless-enabled card 710 to illuminate the inventory management container 700, the wireless-enabled card 710 can cause the lighting element 712 to activate all or a subset of the light sources 714. In some embodiments, instructions can be received at the wireless-enabled cards 710 directly from a wireless transmission; but in other cases, instructions might be received via the contact element 720 from a source connected with a platform such as the container platform 900 (FIG. 9). Once activated, the light sources 714 direct light substantially parallel to the sidewall 702 of the inventory management container 700, and specifically along the sidewall surface 716. In some embodiments, the light sources 714 can be embedded in an edge of the sidewall surface 716 such that light refracts within the sidewall surface 716 and/or reflects off of an interior surface in order to ultimately shine outward from the sidewalls 702 of the inventory management container 700. In some embodiments, the light can travel substantially parallel to the sidewall surface 716, illuminating the sidewall surface 716. In some embodiments, a portion of the light can pass along the sidewall surface 716 and reflect from a reflective surface 718 underneath the top edge 706 of the inventory management container 700, which can direct the light back along the sidewall surface 716 to further illuminate the inventory management container 700. The illustrated lighting element 712 is shown directed upward, but in alternative embodiments, the lighting element 712 could be located at a different part of the inventory management container 700 and directed in a different direction, e.g., underneath the top edge 706 and directed down. In some alternative embodiments, the lighting element 712 can be embedded in or connected directly with the wireless-enabled card 710. For example, a portion of the wireless-enabled card 710 may protrude beyond the sidewall 702 or sidewall surface 716 with the lighting element 712 such that the lighting element can emit light along the sidewall 702 or sidewall surface 716. In embodiments, the lighting element 712 can be connected with the inventory management container 700 by way of being connected with the wireless-enabled card 710 and the wireless-enabled card 710 being inserted into a slot 708 in the inventory management container 700.

Figure 8:
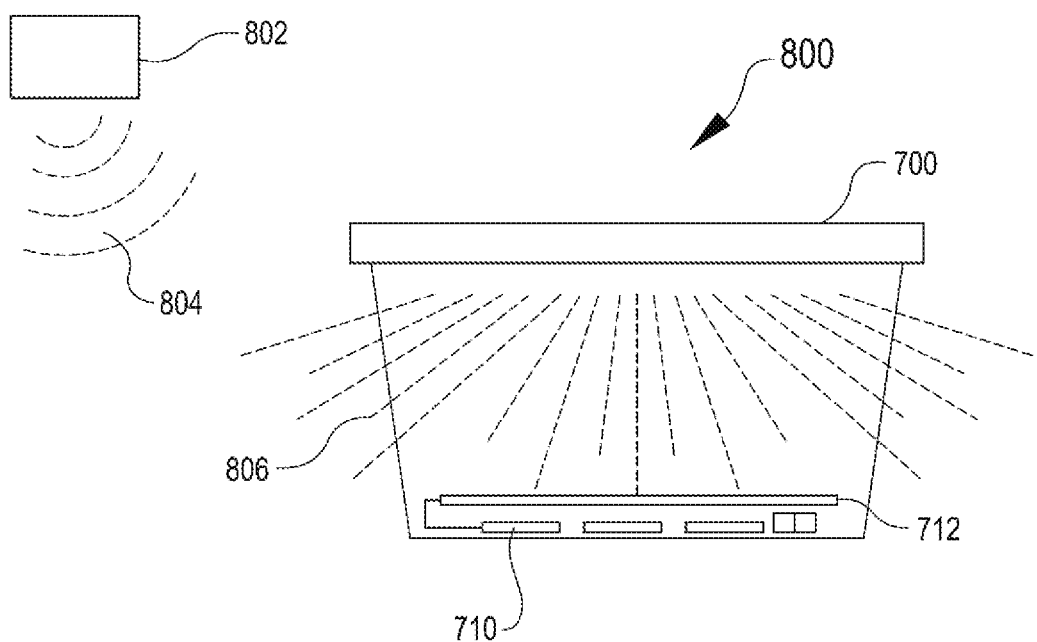
FIG. 8 illustrates an inventory system that includes the inventory management container of FIG. 7 in accordance with embodiments.

FIG. 8 illustrates an inventory system 800 including the inventory management container 700 of FIG. 7 and an inventory manager 802, in accordance with embodiments. The inventory manager 802 transmits a signal 804 configured for activating one or more of the wireless-enabled cards 710 installed in the inventory management container 700. In response to the signal 804, the wireless-enabled cards 710 cause the lighting element 712 to illuminate inventory management container 700 with a predetermined pattern and/or color of illumination 806.

FIG. 9 illustrates an inventory processing system 900 including a container platform 902, an inventory management container 700, and an inventory manager 914, in accordance with embodiments. The container platform 902 includes a plurality of raised elements 906a-c (collectively 906) which delimits sites for situating inventory management containers 700. The container platform 902 can further include a plurality of scanning elements 904a-c (collectively 904) which can scan and collect data for providing to the inventory manager 914 regarding an inventory management container 700 positioned above each scanning element 904 and inventory items 910 added to the inventory management container 700 via, for example, an identifying device 912 of an inventory item 910. The inventory manager 914 can, in some embodiments, communicate with the scanning elements wirelessly, but in some cases may communicate via a wired connection 916 with the container platform 902. Likewise, the inventory manager 914 can communicate with a signal receiver wirelessly, such as the wireless-enabled cards 710 of the inventory management container 700, or in some cases via a wired connection 916, e.g. via a contact element such as the contact element 720. In some embodiments, the identifying device 912 can be an RFID tag. In some embodiments, the scanning elements 904 can be configured to only scan for an inventory item 910, in which case an inventory management container 700 could be identified via the contact element 720 of the inventory management container 700 when it is in contact with a contact element 908a-c (collectively 908) of the container platform 902. In some embodiments, rather than communicating and/or transferring electrical energy via direct electrical contact, the contact elements 720, 908 can communicate with one another and/or transfer electrical energy via near-field or inductive effects, such as inductive power transfer.

Figure 10:
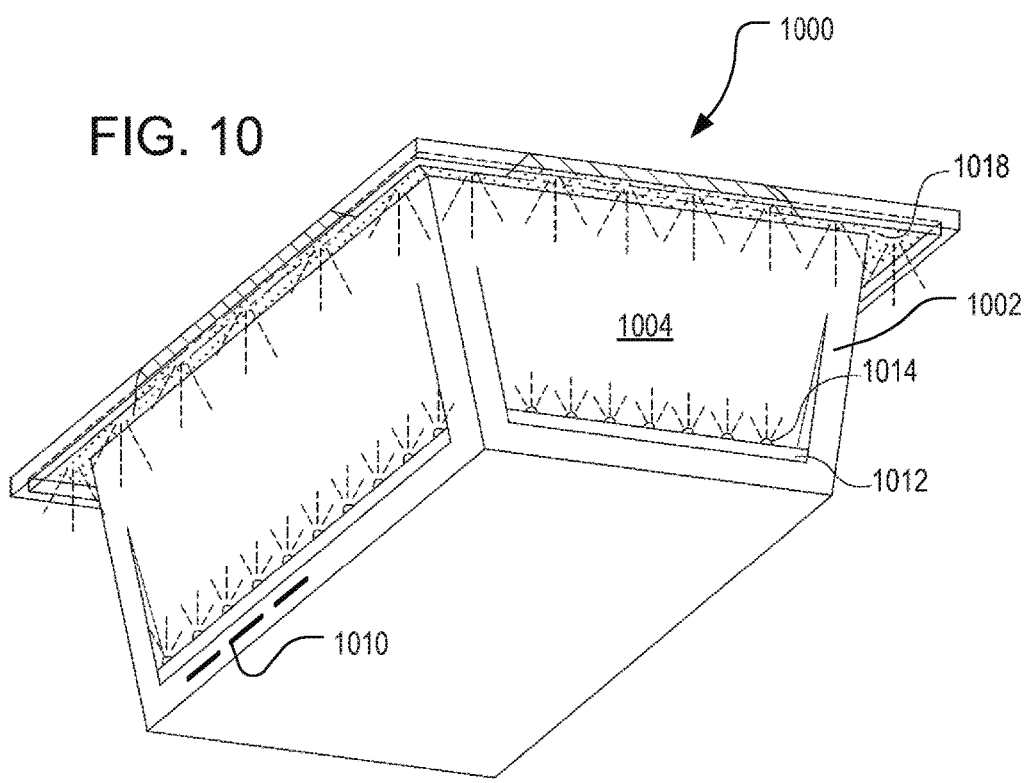
FIG. 10 illustrates another inventory management container in accordance with embodiments.

FIG. 10 illustrates another example of an inventory management container 1000, in accordance with embodiments. The inventory management container 1000 includes sides 1002, sloped sidewalls 1004 that are sloped relative to the sides 1002, illuminating elements 1012, and light sources 1014 connected with the illuminating elements 1012 and arranged to shine light along the sloped sidewalls 1004 and toward a downward-facing reflective, translucent, and/or transparent surface 1018. This inventory management container 1000 also contains wireless-enabled cards 1010 analogous to the wireless-enabled cards 710 described above (FIGS. 7-9) for controlling the illuminating elements 1112.

Figure 11:
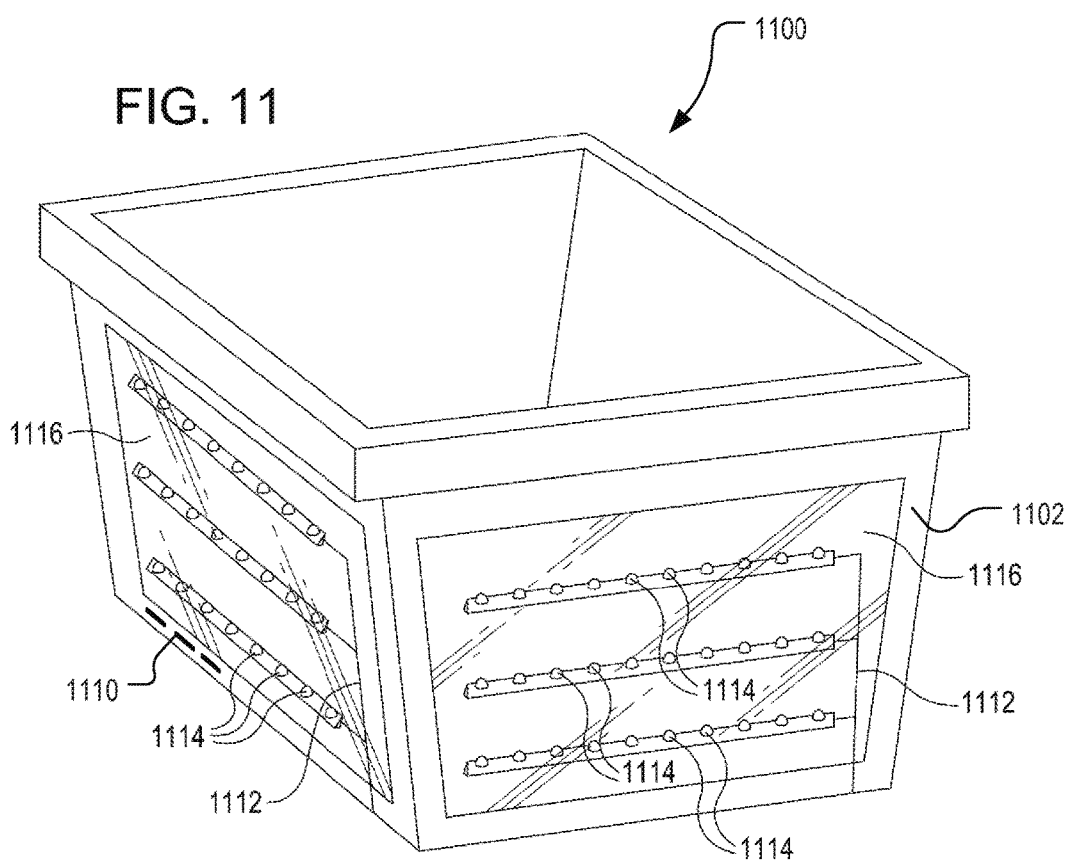
FIG. 11 illustrates another inventory management container in accordance with embodiments.

FIG. 11 illustrates an additional example of an inventory management container 1100, in accordance with embodiments. The inventory management container 1100 includes sides 1102 and transparent and/or translucent sidewalls 1116 containing a network of embedded illuminating elements 1112 and light sources 1114 on the illuminating elements. When the illumining elements 1112 are active, the light sources 1114 embedded in the sidewalls 1116 shine through the sidewalls, causing the inventory management container 1100 to glow. In some embodiments, all of the light sources 1114 may be embedded in the sidewalls 1116. In some embodiments, a portion of the light sources 1114 of the inventory management container 1100 may be embedded in the sidewalls 1116 in conjunction with one or more additional illuminating elements (not shown). The inventory management container 1100 also contains wireless-enabled cards 1110 analogous to the wireless-enabled cards 710 described above (FIGS. 7-9) for controlling the illuminating elements 1112.

Figure 12:
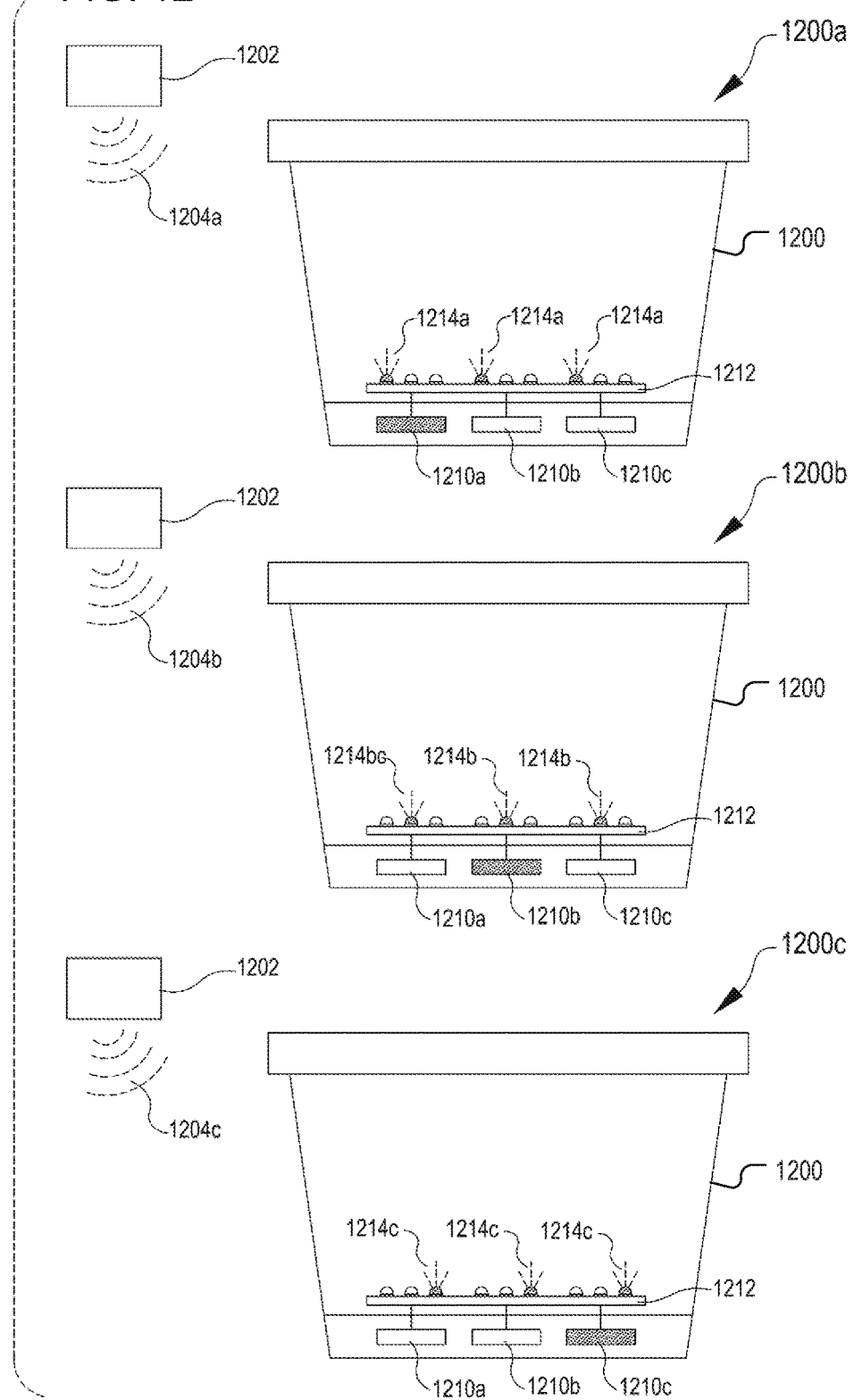
FIG. 12 illustrates an inventory management container having multiple illumination modes in accordance with embodiments.

FIG. 12 illustrates an inventory management container 1200 having multiple illumination modes 1200a-c. In a first illumination mode 1200a, an inventory manager 1202 transmits a signal 1204a which is keyed to activate a first wireless-enabled card 1210a of a particular inventory management container 1200. When the first wireless-enabled card 1210a is activated, it activates an illumination element 1212 in order to illuminate a first subset 1214a of light sources (cumulatively, 1214). In some embodiments, the first subset 1214a may be a particular color, configured to illuminate in a particular pattern (e.g. strobing or flashing), directed to illuminate a particular portion of the inventory management container 1200, or another suitable illumination mode. In a second illumination mode 1200b, the inventory manager 1202 transmits a signal 1204b which is keyed to activate a second wireless-enabled card 1210b of the inventory management container 1200. The second wireless-enabled card 1210b activates the illumination element 1212 to illuminate a second subset 1214b of the light sources. In some embodiments, the second subset 1214b can illuminate in a different way than the first subset, for example, in a second color, different pattern, or directed to a different portion of the inventory management container 1200 than the first subset 1214a. In a third illumination mode 1200c, the inventory manager 1202 transmits a third signal 1204c which is keyed to activate a third wireless-enabled card 1210c of the inventory management container 1200. The third wireless-enabled card 1210c activates the illumination element 1212 to illuminate a third subset 1214c of the light sources. In some embodiments, the third subset 1214c can illuminate in a different way than either of the first and second subsets 1210a-b, for example, in yet a third color, pattern, or directed to a different portion of the inventory management container 1200, or any suitable combination of the above.

The wireless-enabled cards 1210 may be configured to cause the respective illumination modes 1200a-c in a variety of ways. For example, in some embodiments, each wireless-enabled card 1210 may include an RFID tag 1506 (FIG. 15) configured to activate when the wireless-enabled card 1210 receives a particular signal. Thus, each wireless-enabled card 1210 can operate simply by, responsive to the activation, causing a signal to flow to the illumination element 1212. Each wireless-enabled card 1210 could interact with the illumination element 1212 by, for example: switching on a particular pathway associated with the particular wireless-enabled card 1210 in the illumination element 1212, directly powering a subset 1214*a-c* of the light sources 1214, including a signal that causes the illumination element to switch on a particular subset 1214*a-c* of the light sources 1214, or other suitable means of interacting with the illumination element to achieve the result of a particular illumination mode. In some embodiments, more than one wireless-enabled card 1210 may be activated at a time, in order to achieve a combination of more than one illumination mode. In some embodiments, multiple RFID tags may be included in a wireless-enabled card 1210, thus increasing the functionality of each wireless-enabled card.

In some embodiments, each wireless enabled card 1210 may include a wireless receiver 1606 connected with a processor and/or memory 1608, 1610 (FIG. 16) configured to activate in response to a signal 1204. In such cases, the signal 1204 can further include instructions indicating an illumination mode, such that a single wireless-enabled card 1210 may be operable to activate more than one illumination mode.

Figure 13:
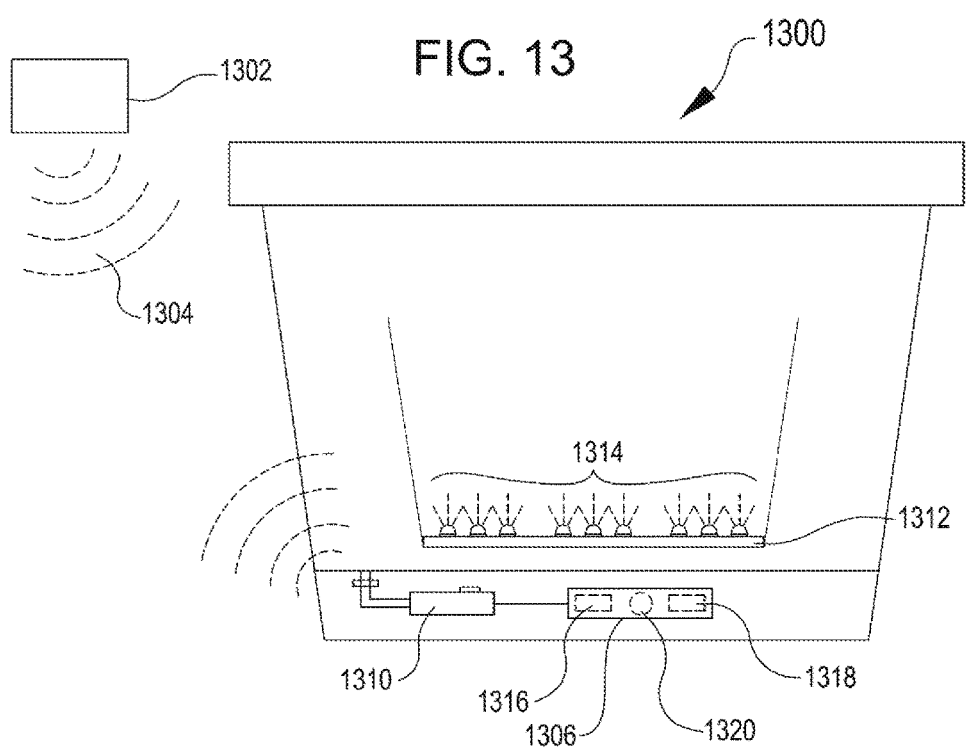
FIG. 13 illustrates another inventory management container having multiple illumination modes in accordance with embodiments.

FIG. 13 illustrates another example of an inventory management container 1300 having multiple illumination modes, in accordance with embodiments. The inventory management container 1300 includes a wireless receiver 1310 configured to receive a signal 1304 from an inventory manager 1302, and communicate those signals to a control card 1306. The control card 1306 can include any suitable combination of a processor 1316, memory 1320, and/or a controller 1318 for receiving instructions from the processor 1316 to activate an illumination element 1312 according to various modes. The various modes, as described previously in reference to FIG. 12, can include activating any suitable subset of the light sources 1314 in order to achieve illumination modes of various suitable colors, intensity, illumination patterns, or other modes. In some embodiments, instructions to activate a particular illumination mode can be stored in memory 1320, and the signal 1304 can include information corresponding to an identity of the particular inventory management container 1300 and corresponding to the desired illumination mode. In some alternative cases, the signal 1304 can also include the instructions to activate the particular illumination mode. Additionally, the wireless receiver 1310 can also be configured to transmit a return signal, for example, in response to a query in the signal 1304 from the inventory manager 1302.

Figure 14:
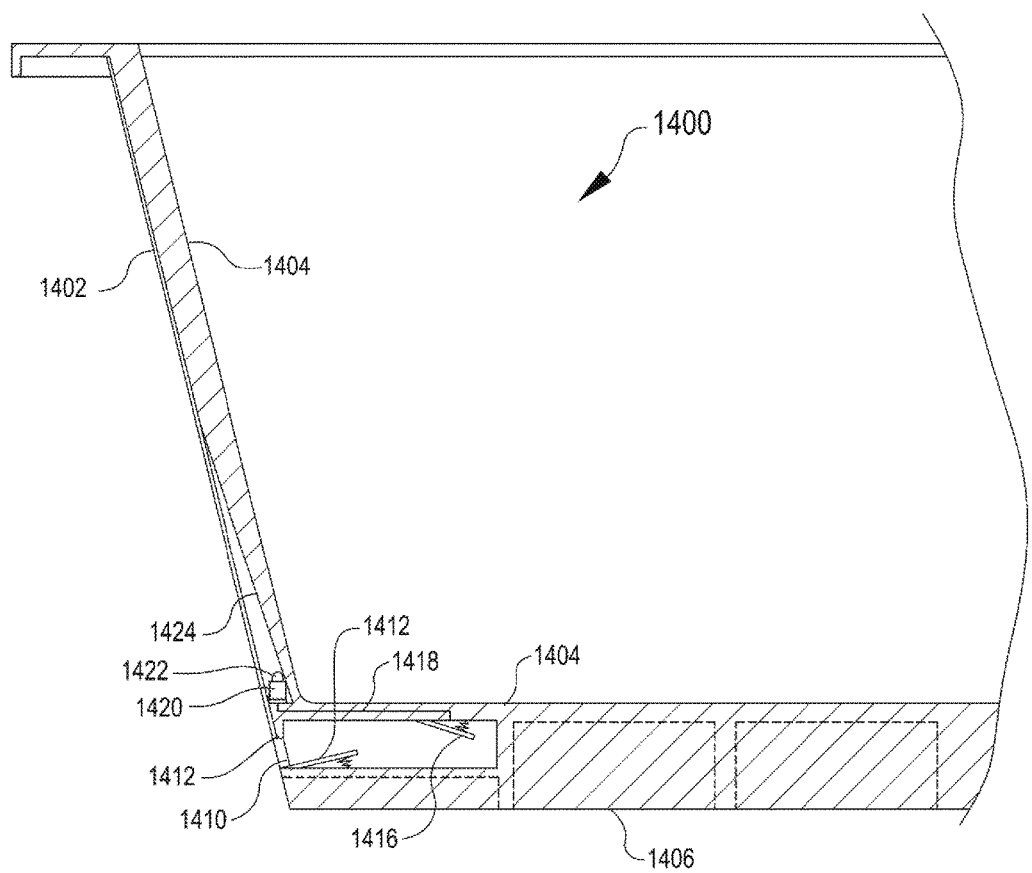
FIG. 14 is a cross-sectional view illustration of components of an inventory management container in accordance with embodiments.
Figure 15:
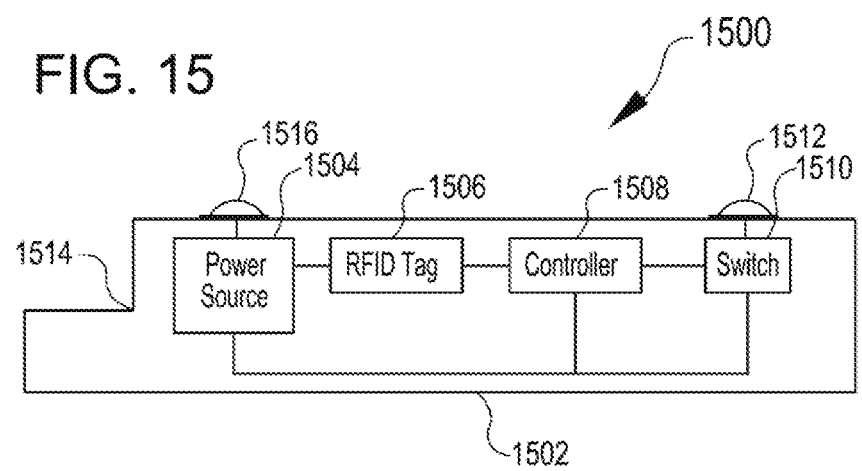
FIG. 15 is a simplified schematic illustration of an RFID card for use in an inventory management container in accordance with embodiments.
Figure 16:
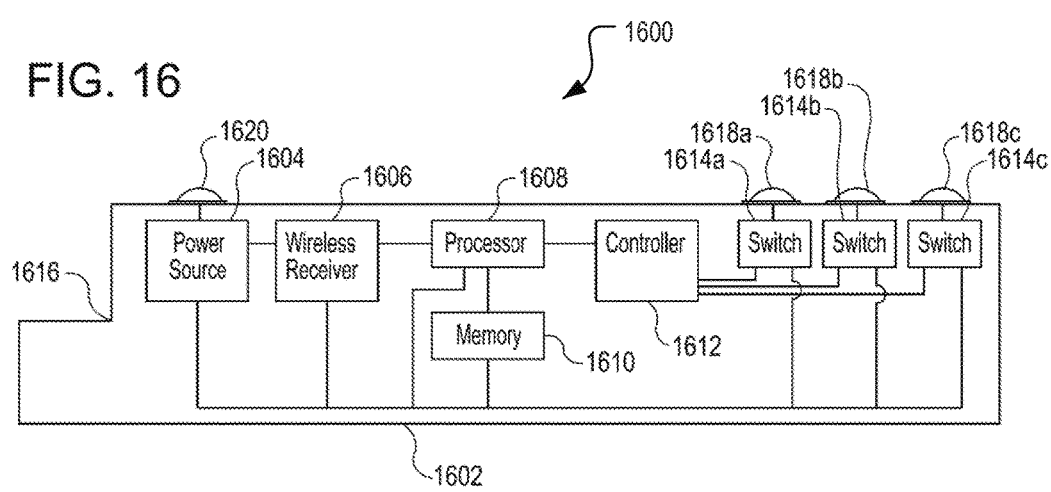
FIG. 16 is a simplified schematic illustration of a wireless-enabled card for use in an inventory management container in accordance with embodiments.

FIG. 14 illustrates in a side-section view components of an inventory management container 1400, in accordance with embodiments. The inventory management container 1400 can include a container body 1404 with a container base 1406 and a translucent and/or transparent sidewall 1402, which may be a coating, covering, film, or additional panel which is added to the container body 1404, or a portion of the container body 1404. A sidewall section 1424 is indented from the container body 1404 to accommodate an illumination element 1420 having light sources 1422, which connects with a card slot 1410 in the container base 1406 that can receive a card such as wireless-enabled card 1500 or 1600 (FIGS. 15-16). The card slot 1410 can include retention features 1412 and a retention spring 1412 for removably securing a wireless-enabled card placed therein, and may also include one or more contact elements 1416 for providing electrical contact between a wireless-enabled card and the illumination element 1420, and/or for connecting a wireless-enabled card and an external power supply.

FIG. 15 illustrates in a side-section schematic a wireless-enabled RFID card 1500 for use in an inventory management container, such as the inventory management container 1400 (FIG. 14). The RFID card 1500 can include a card body 1502, power source 1504, RFID tag 1506 connected to the power source, controller 1508 connected to the RFID tag 1506 and power source 1504, and switch 1510 connected to the power source 1504, and controller 1508. In some embodiments, some or all of the above components may be combined. The power source can be connected with a charging contact 1516 in order to connect an external power supply in order to supplement, bypass, and/or recharge the power source 1504. A control contact 1512 is connected with the switch 1510, such that the controller 1508 can cause the switch 1510 to open or close a circuit to provide power to an illuminating element such as illuminating element 1420 (FIG. 14). The RFID tag 1506 can be configured to, in response to receiving a signal, cause the controller 1508 to activate or deactivate the switch 1510. The RFID card 1500 also has a retention feature 1514 configured to match a retention feature 1412 (FIG. 14) for retaining the RFID card 1500 in an operable position.

FIG. 16 illustrates in a side-section schematic another wireless-enabled card 1600 for use in an inventory management container, such as the inventory management container 1400 (FIG. 14). The wireless-enabled card 1600 can include a card body 1602, power source 1604, wireless receiver 1606 connected with the power source 1602, processor 1608 connected with the wireless receiver 1606 and power source 1604, memory 1610 connected with the processor 1608 and power source 1604, a controller 1612 connected with the processor 1608, and a plurality of switches 1614*a-c* (collectively 1614) which are connected with the controller 1612 and the power source 1604, and configured to cause, under the control of the controller 1612, electrical energy to flow to one or more of the plurality of control contacts 1618*a-c* (collectively 1618) which are connectable with an illuminating element, such as illuminating element 1420 (FIG. 14). The wireless receiver 1606 can be configured to, in response to receiving a signal containing an illumination instruction, cause the processor 1608 to process the signal by, for example, accessing the memory 1610 and/or causing the controller 1612 to actuate one or more of the plurality of switches 1614. In turn, electrical energy can flow from the power source 1604 through the actuated switch or switches 1614 in order to activate an illumination element such as illumination element 1420 (FIG. 14). In some embodiments, the processor 1608 may compare the signal to data stored in the memory 1610 to determine whether an inventory management container associated with the wireless-enabled card 1600 is the intended recipient of an illumination instruction prior to interacting with the controller 1612, but in other cases, the wireless receiver 1606 may filter signals not targeting the associated inventory management container. In some embodiments, the processor 1608 may further process the signal by comparing the signal to data stored in the memory 1610 to determine a particular illumination mode indicated in the signal, and cause the controller 1612 to actuate one or more of the plurality of switches 1614 in order to achieve the particular illumination mode. The wireless-enabled card 1600 can also have a retention feature 1616 configured to match a retention feature 1412 (FIG. 14) for retaining the wireless-enabled card 1600 in an operable position.

Figure 17:
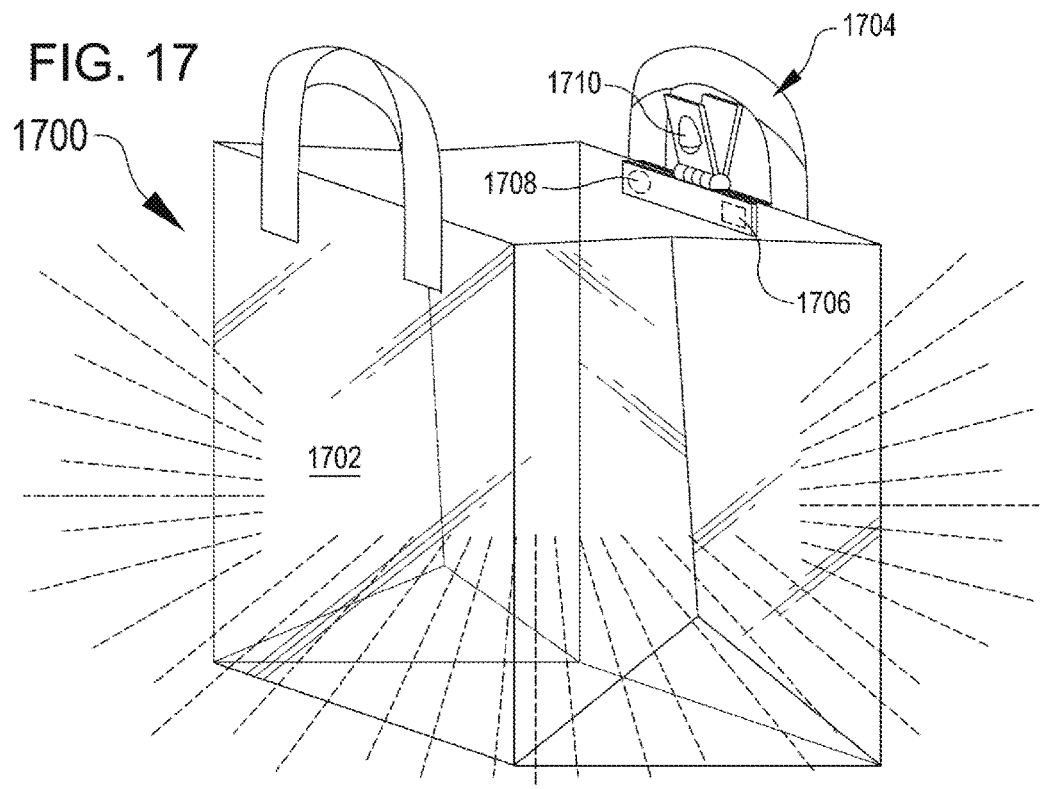
FIG. 17 illustrates an inventory management bag having an illuminating attachment in accordance with embodiments.

FIG. 17 illustrates an inventory management bag 1700 having an illuminating attachment 1704. As discussed above, various forms of self-illuminating inventory management containers are within the scope of the disclosed embodiments. However, further inventory management elements in an inventory system may be amenable to illumination via the techniques herein described. For example, an inventory bag 1700, which may also be a package, intended for delivery to a customer, can include a bag body 1702 and an illuminating attachment 1704 configured to removably attach with the bag body 1702. The illuminating attachment 1704 can include a wireless-enabled card 1706 embedded in or otherwise attached with the illuminating attachment 1704, a power source 1708 such as a battery, and an illuminating element 1710 connected with the wireless-enabled card 1706 and the power source 1708. In some embodiments, the power source 1708 can be embedded in or attached with the illuminating attachment 1704, or can be integrated with the wireless-enabled card 1706. In some embodiments, the illuminating element 1710 can also be attached with or integrated with the wireless-enabled card 1706. The inventory management bag 1700 can be transparent and/or translucent, such that the illuminating element 1710 can cause the inventory management bag 1700 to appear to glow by shining light into or onto a portion of the bag body 1702. In some embodiments, portions of the inventory management bag 1700 or bag body 1702 can be formed of a self-illuminating material or a fluorescent material that can re-emit light. In some embodiments, the illuminating element 1710 can instead or additionally shine light into the environment around the inventory management bag 1700.

Figure 18:
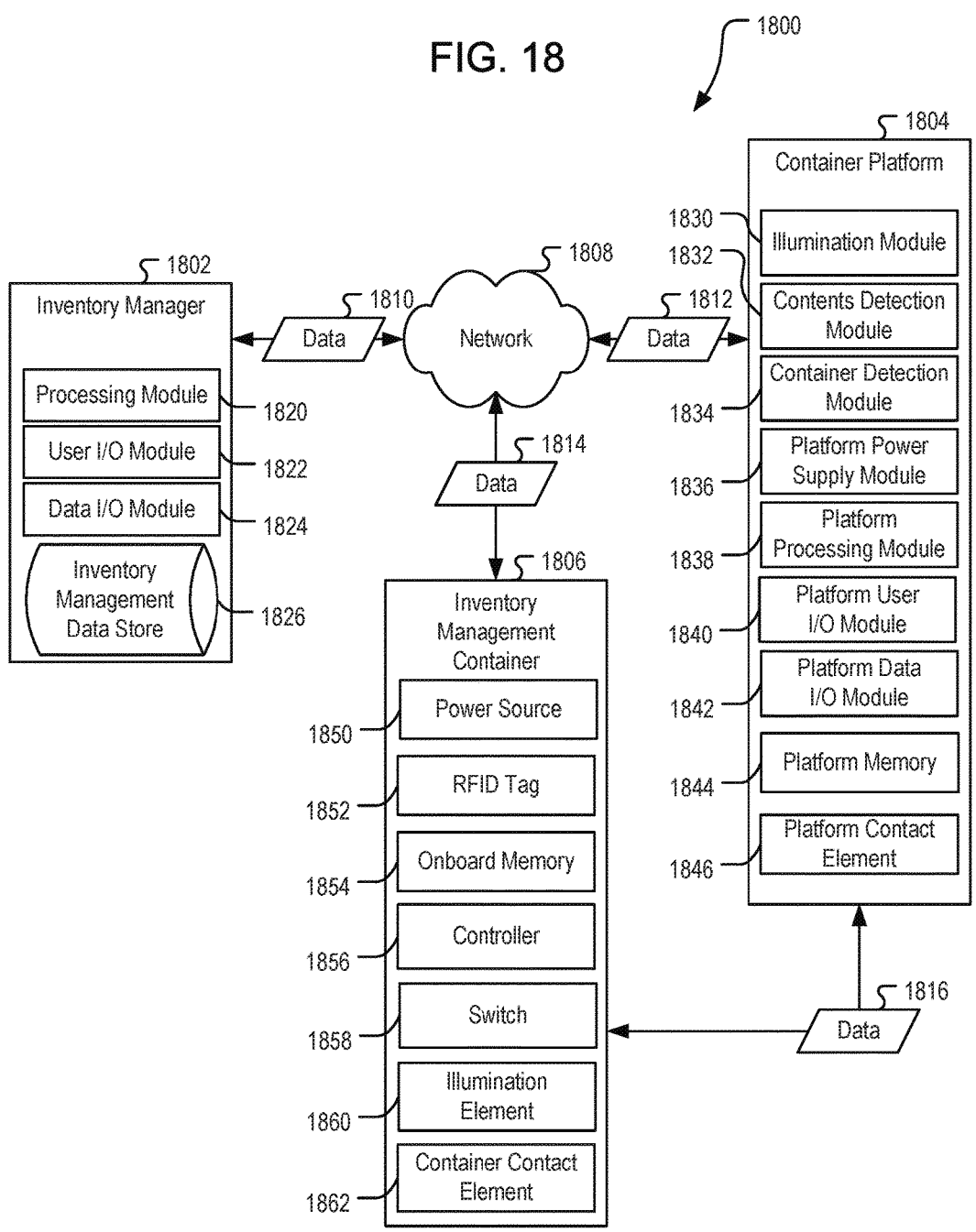
FIG. 18 is a simplified block diagram illustrating a system for using an inventory management container in an inventory management system in accordance with embodiments.

FIG. 18 illustrates a block diagram of a system 1800 for using an inventory management container in an inventory system, in accordance with embodiments. For example, the system 1800 can include an inventory manager 1802, a container platform 1804, and an inventory management container 1806. The inventory manager 1802, container platform 1804, and inventory management container 1806 can communicate data 1810, 1812, 1814 with one another via a network 1808, although in some cases a container platform 1804 can also communicate data 1816 directly with the inventory management container 1806, e.g. via an electrical contact, local network, or other suitable communication means. The inventory manager 1802 can include a processing module 1820 for processing data, a user I/O module 1822 for displaying information to a human user and/or receiving input from a user, a data I/O module 1824 for communicating data 1810 with the network 1808 for communicating with the inventory management container 1806 and/or the container platform 1804, and an inventory management data store 1826 for storing information regarding, for example, inventory items in the inventory system, inventory management containers in the inventory system, destinations and origins of particular inventory management containers, and associations between the above, such as, but not limited to, groups of inventory items intended to be grouped together in a particular inventory management container and the intended routing of items and inventory management containers through the inventory system.

A container platform 1804 can accommodate one or more inventory management containers 1806 in order to enable an efficient loading and/or unloading process of the inventory management containers by, e.g., a user. The container platform 1804 can include, for example, an illumination module 1830, a contents detection module 1832, a container detection module 1834, a power supply module 1836, a platform processing module 1838, a platform user I/O module 1840, a platform data I/O module 1842, a platform memory 1844, and a platform contact element 1846. An inventory management container 1806 can include, for example, some or all of: a power source 1850, an RFID tag 1852, an onboard memory 1854, a controller 1856, a switch 1858, an illumination element 1860, and a container contact element 1862.

Some or all of the above modules can be used to cause the container platform 1804 to interact with the inventory management container 1806 when the inventory management container 1806 is placed on, or in an active position relative to, the container platform 1804. For example, In some embodiments, the container platform 1804 can receive an inventory management container 1806 and can detect the presence of the inventory management container 1806 via a container detection module 1834, which can include a sensor for scanning a tag (e.g. RFID tag 1852), chip, or visual code (e.g. a barcode) of the inventory management container 1806. In some embodiments, the container platform 1804 can interface with the inventory management container 1806 by, for example, connecting a power supply module 1836 with the inventory management container power source 1850 via a platform contact element 1846 and container contact element 1862 in order to: transfer electrical power, charge the power source 1850, and transfer data 1816. The platform processing module 1838 and platform memory 1844 can process data obtained from or related to the inventory management container 1806 and/or from the network 1808 such as, for example, an identity (e.g. stored identifier) of the inventory management container stored in the RFID tag 1852 and/or onboard memory 1854 of the inventory management container 1806, the location of the inventory management container 1806 in the inventory system, a power level of the power source 1850, or other suitable information.

The contents detection module 1832 can scan a region proximate to the container platform 1804 in order to detect and identify contents of the inventory management container, such as an inventory item. In some embodiments, the contents detection module 1832 can include an RFID scanner for obtaining an identifier of the contents based on an RFID tag or chip attached with the contents. In some alternative cases, a contents detection module 1832 can include a visual and/or infrared scanner, or other suitable scanner, for reading a machine-readable identifier from the contents. The contents detection module 1832 can, in some embodiments, identify one or more items such as an inventory item after said item has already been placed in the inventory management container 1806 on the container platform 1804, but in some cases the contents detection module 1832 can instead, or in addition, scan each item as it is being moved to or from, or placed in, the inventory management container 1806. In some embodiments, platform user I/O module 1840 can provide a suitable platform for a user to provide additional information to the container platform 1804, such as an override of a pending instruction to add an inventory item.

In some embodiments, the container platform 1804 also includes an illumination module 1830 that is in communication with the illumination element 1860 and/or controller 1856 of the inventory management container 1806, and in communication with the inventory manager 1802 in order to facilitate the illumination of the inventory management container. For example, the illumination module 1830 can, in some embodiments, provide instructions to the controller 1856 to activate the switch 1858 that connects the illumination element 1860 with power from the power source 1850 and/or from the power supply module 1836.

In some embodiments, the inventory management container 1806 can receive instructions from and/or provide data back to the inventory manager 1802. For example, in some cases the inventory management container 1806 can receive illumination instructions from the inventory manager 1802 directly via the network 1808, in which case the onboard memory and/or controller 1856 may cause the switch 1858 to connect the power source 1850 and illumination element 1860 in order to activate the illumination element 1860 for illuminating the inventory management container 1806. In some embodiments, the instructions can be received by way of the inventory manager 1802 interrogating the RFID tag 1852 of the inventory management container 1806, such that the RFID tag 1852 accesses the onboard memory 1854 in order to trigger the controller 1856 to cause the illumination as described above.

Figure 19:
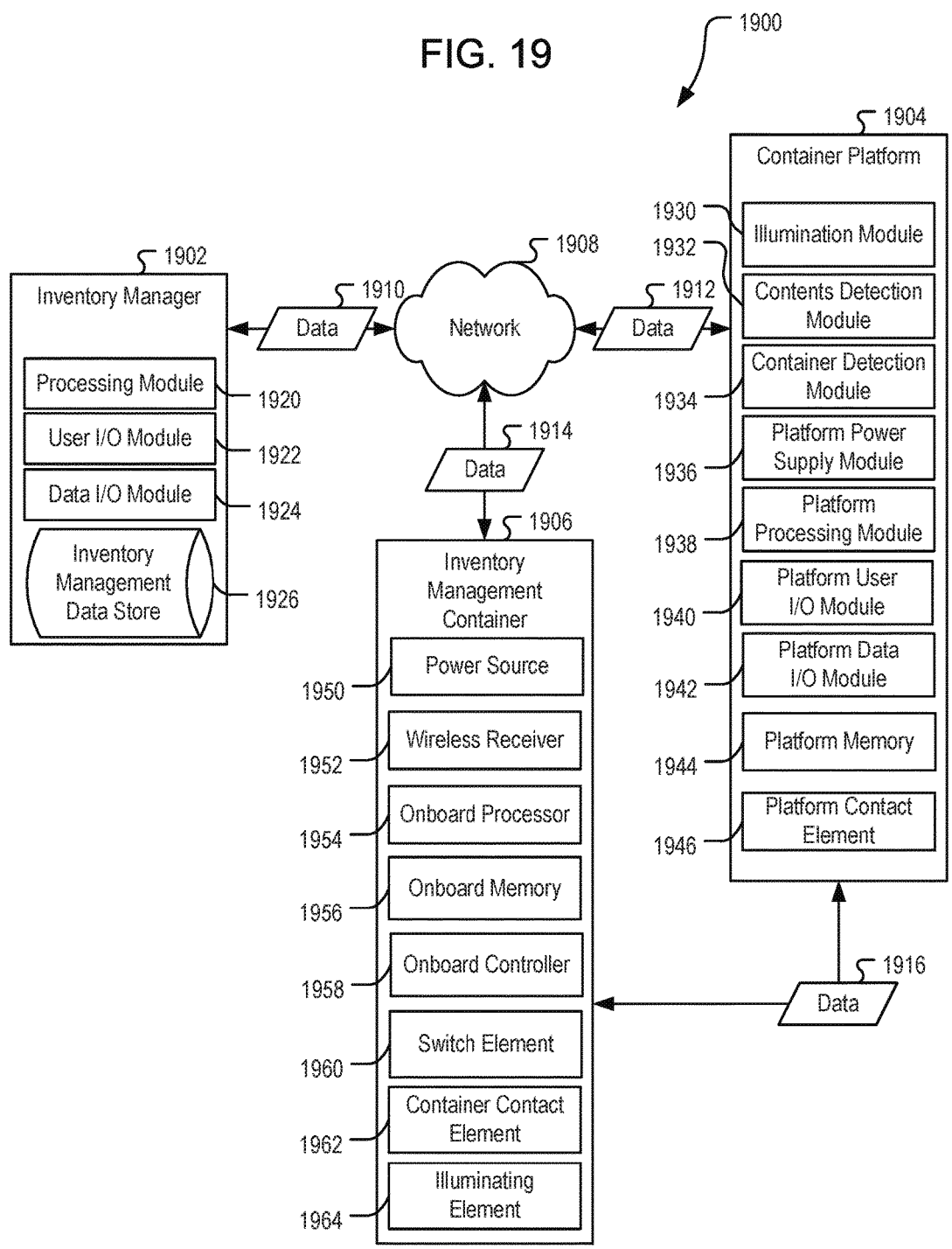
FIG. 19 is a simplified block diagram illustrating another system for using an inventory management container in an inventory management system in accordance with embodiments.

FIG. 19 illustrates components of another system 1900 for using an inventory management container in an inventory management system, according to embodiments. As in the system 1800 described above (FIG. 8) the system 1900 includes an inventory manager 1902, a container platform 1904, and an inventory management container 1906 in communication with one another via, for example, a network 1908 that transmits data 1910, 1912, 1914; and the inventory management container 1906 and loading platform 1904 can be additionally connected via electrical contact and/or a local network 1916. The container platform 1904 can, similarly to the container platform 1804 described above, include an illumination module 1930, contents detection module 1932, container detection module 1934, power supply module 1936, processing module 1938, a platform user I/O module 1940, a platform memory 1944, and a platform contact element 1946. In some embodiments, the container platform 1904 can also include a data I/O module 1942 for communicating data with the inventory manager 1902 and/or with the inventory management container 1906. Likewise, the inventory manager 1902 can, like the inventory manager 1802 of FIG. 18, include a processing module 1920, user I/O module 1922, data I/O module 1924, and an inventory management data store 1926. The above components can communicate with one another and with an inventory management container 1906.

The inventory management container 1906 can include a power source 1950, onboard processor 1954 and memory 1956, an onboard controller 1958, a switch element 1960, an illuminating element 1964, and contact element 1962 for enabling direct connection and/or charging between the inventory management container 1906 and the container platform 1904, as described above with respect to inventory management container 1806 of FIG. 18. Further, the inventory management container 1906 can also include a wireless receiver 1952 capable of, for example, receiving complex instructions from the inventory manager 1902. For example, complex instructions may further include instructions to operate an illuminating mode, e.g. providing the onboard controller 1958 with instructions to activate the illuminating element 1964 in a particular manner, e.g. activating one or more subset of light sources, activating an illumination pattern of one or more light sources, or other suitable illuminating mode.

Figure 20:
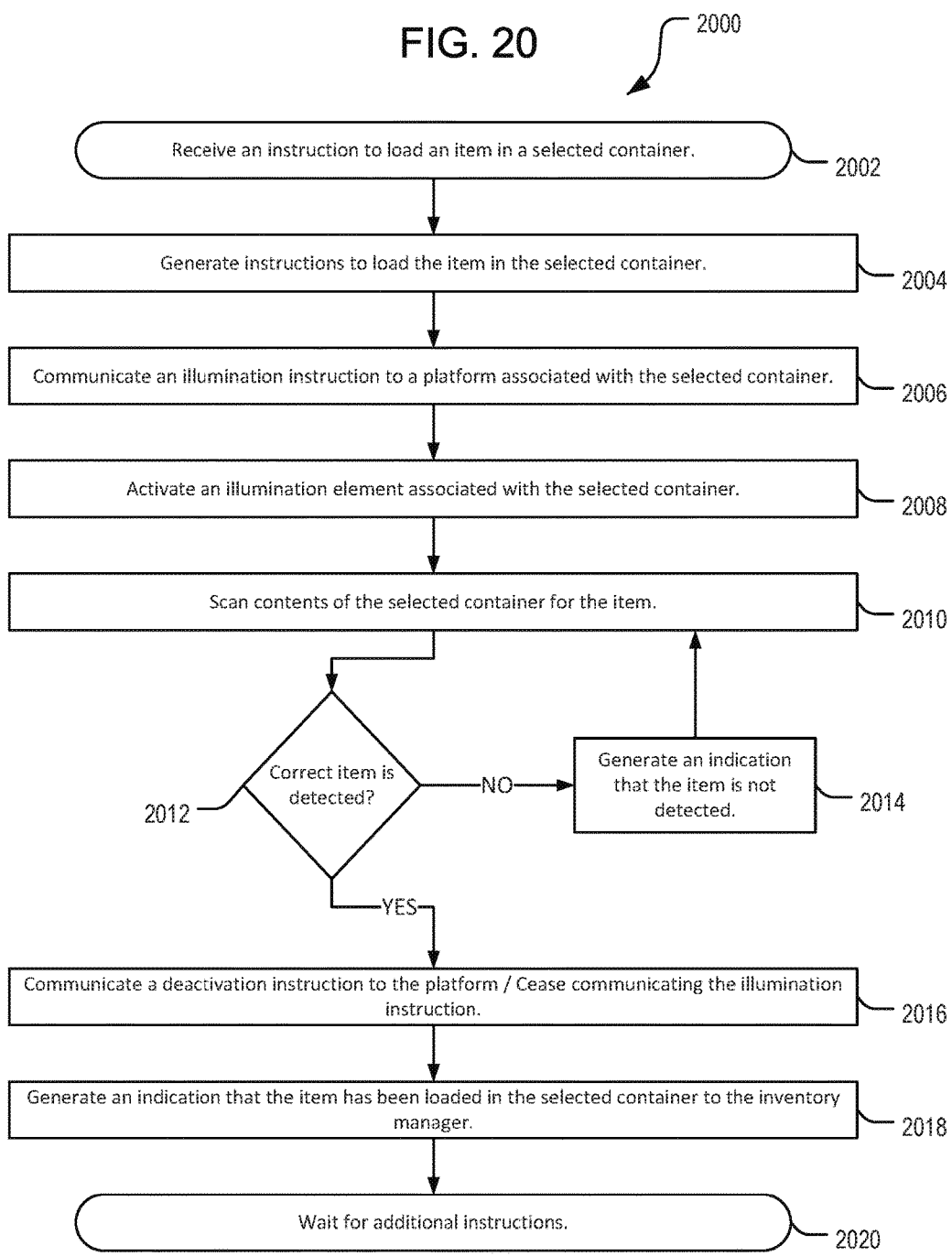
FIG. 20 illustrates a process for using an inventory management container in an inventory management system in accordance with embodiments.

FIG. 20 illustrates a process 2000 for using an inventory management container, such as the container 700 (FIG. 7) in an inventory management system. Aspects of the process 2000 may be performed, in some embodiments, by a system similar to one of the inventory management systems 1800, 1900 (FIGS. 18-19). The systems may be implemented for applications and in environments such as those applications and environments shown in FIGS. 1-6.

In an embodiment, the process 2000 includes receiving instructions for loading an item in a selected inventory management container (act 2002). In some embodiments, the instructions may indicate unloading, adjusting, or otherwise manipulating the item; or may indicate a position in a container platform associated with the container rather than, or in addition to, indicating the container. Next, the process includes generating instructions to load the item in the selected container or at the specified position (act 2004). In some embodiments, the process generates instructions to unload an item or selection of items from the selected container or from a container at the specified position. In some embodiments, the process generates instructions to unload all items from a selected container or from a container at the specified position. An illumination instruction may be communicated to the platform associated with the selected container (act 2006), which further communicates the illumination instruction to an illumination element associated with the selected container in order to activate the illumination element (act 2008). In some embodiments, the illumination instruction may be communicated directly to a component of the selected container without the platform as an intermediary. The illumination instruction may be configured to cause the selected container to illuminate. In some cases, the illumination instruction may be configured to activate a particular illumination mode of the selected container.

Next, the system can scan the contents of the selected container for the item (act 2010), and may scan iteratively over a period of time, or may scan in response to a trigger (e.g., a sensor indicating that an item has been placed in a container). If the item is not detected (act 2012), the system can generate in indication that the item is not detected in the selected container (act 2014). In some embodiments, the system can scan for an item and, responsive to detecting the wrong item, generate a modified indication, e.g., a different illumination instruction, indicating that an incorrect item was detected. If the correct item is detected (act 2012), the system can communicate a deactivation instruction to the illumination element and/or can cease communicating a continuous illumination instruction (act 2016) so as to cause the container to cease illumination. The system can further generate an indication for an inventory manager that the item has been loaded in the selected container (act 2018), following which the inventory manager can move on to issuing additional instructions (act 2020).

Figure 21:
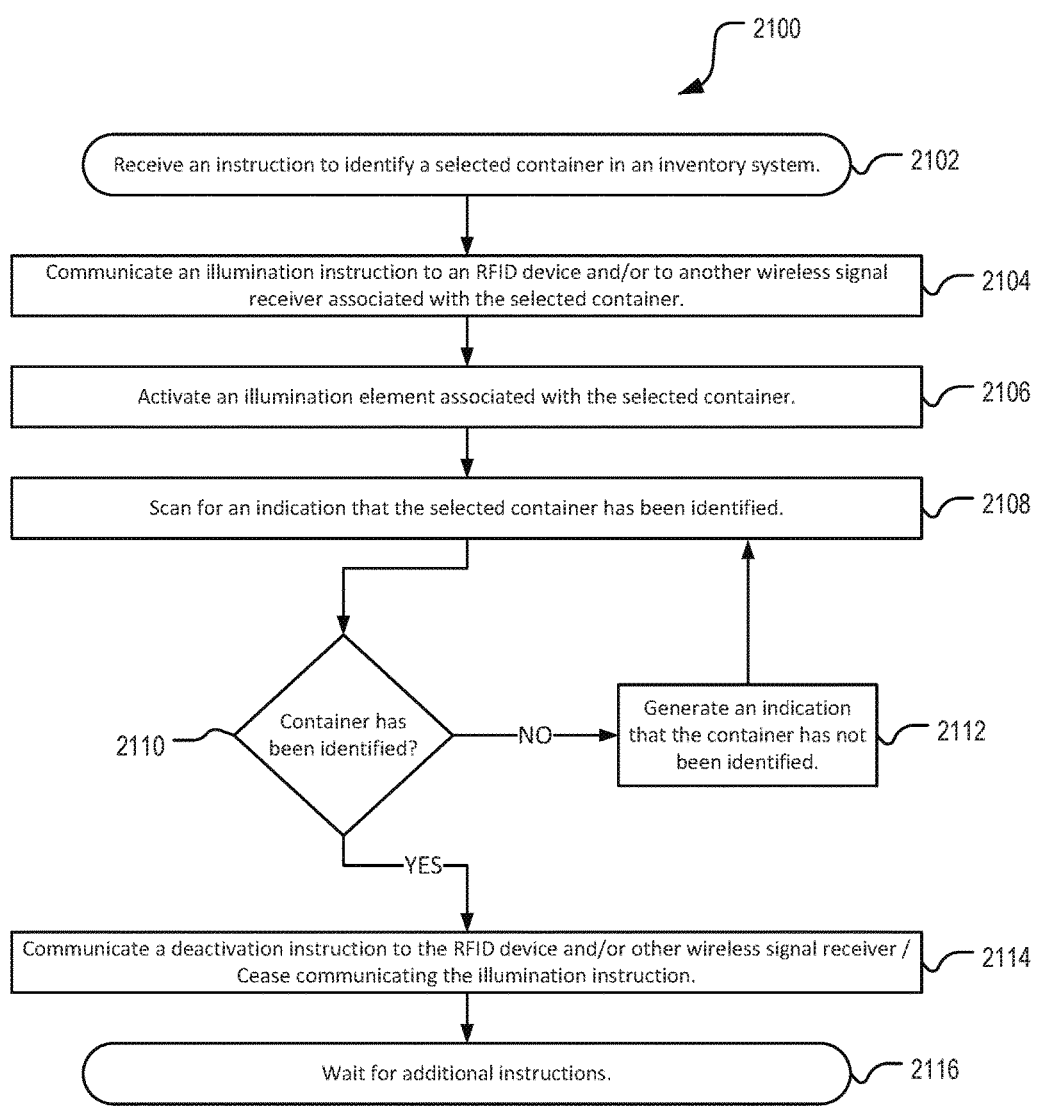
FIG. 21 illustrates another process for using an inventory management container in an inventory management system in accordance with embodiments.

FIG. 21 illustrates a second process 2100 for using an inventory management container, such as the container 700 (FIG. 7) in an inventory management system. Aspects of the process 2100 may be performed, in some embodiments, by a system similar to one of the inventory management systems 1800, 1900 (FIGS. 18-19). The systems may be implemented for applications and in environments such as those applications and environments shown in FIGS. 1-6.

In an embodiment, the process 2100 includes receiving instructions that identify a selected container, which may in some cases be at an arbitrary and/or unknown position, in an inventory system (act 2102). The system can communicate an illumination instruction to an RFID device and/or to a wireless signal receiver associated with the selected container (act 2104), following which the RFID device and/or wireless signal receiver communicates an illumination instruction to an illuminating element in that container (act 2106). The illumination instruction is configured to cause the illuminating element to illuminate the container. Next, the system can scan for an indication that the selected container has been identified (act 2108). The scanning can be implemented by a variety of techniques. For example, where the illuminated container is expected to provide a clear signal to operators of the inventory system, scanning for an indication can include receiving information, i.e. from an input at a terminal in the system, that the container has been found and/or segregated. Alternatively, the inventory system can include one or more light sensors configured to detect an increase in illumination in a region of the inventory system; or the illumination can be concomitant with the selected container transmitting a return signal which may be detected via a wireless receiver.

While the container has not been identified (act 2110), the system can generate an indication that the container has not yet been identified (2112) and can iteratively scan, e.g., for a predetermined period of time or for a predetermined number of iterations. When the container has been identified (act 2110), the system can communicate a deactivation instruction to the illuminating element or, in the case that illumination requires a continuous or repeated signal, can cause the system to cease communicating the illuminating instruction (act 2114), following which the inventory manager can move on to issuing additional instructions (act 2116).

Figure 22:
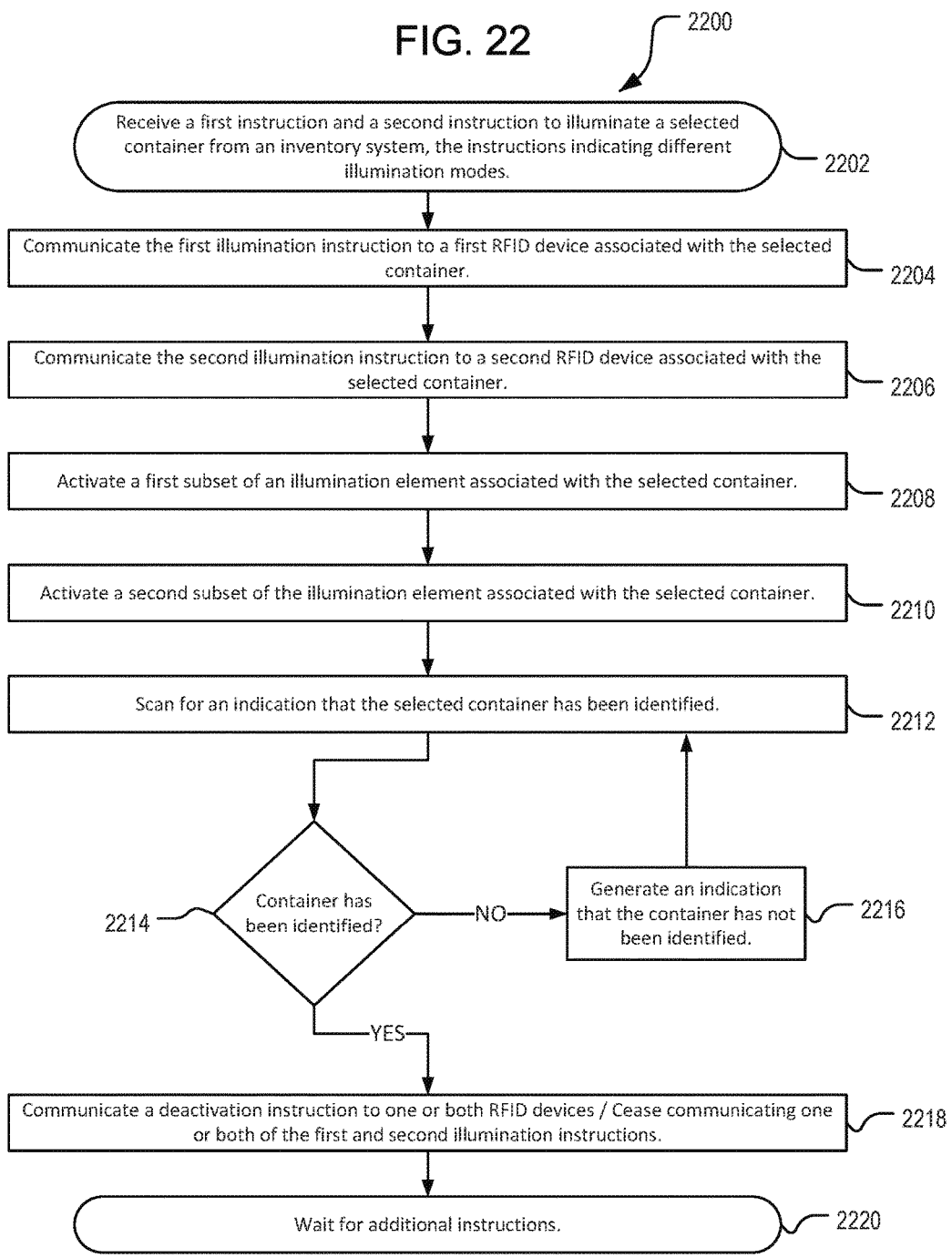
FIG. 22 illustrates another process for using an inventory management container in an inventory management system in accordance with embodiments.

FIG. 22 illustrates a third process 2200 for using an inventory management container, such as the container 700 (FIG. 7) in an inventory management system. Aspects of the process 2200 may be performed, in some embodiments, by a system similar to one of the inventory management systems 1800, 1900 (FIGS. 18-19). The systems may be implemented for applications and in environments such as those applications and environments shown in FIGS. 1-6.

In an embodiment, the process 2200 includes receiving first and second instructions for illuminating a selected container from the system (act 2202), where the first and second instructions can indicate different illumination modes. Next, the first illumination instruction is communicated to a first RFID device associated with the selected container (act 2204); and the second illumination instruction is communicated to a second RFID device also associated with the selected container (act 2206). The system can then activate a first subset of an illumination element associated with the selected container (act 2208) based on the first illumination instruction; and can activate a second subset of the illumination element associated with the same container (act 2210) based on the second illumination instruction. Illumination modes caused by the first and second instructions can be the same mode (i.e., the two subsets can be overlapping or the same, such that the subsets act essentially as backup processes for one another; or can differ in some respect such that a visual scan would determine that one or the other subset was out of power or otherwise disabled). Illumination modes caused by the first and second instructions could also be visibly different, such that each mode can indicate a different status of the associated container.

Next, the system can scan for an indication that the selected container has been identified (act 2212) via any technique for scanning as described above in reference to process 2100 (FIG. 21). While the container has not been identified (act 2214), the system can generate an indication that the container has not yet been identified (act 2216) and can iteratively scan (act 2212). When the container has been identified (act 2214), the system can communicate a deactivation instruction to one or both RFID devices and/or cease communicating one or both of the first and second illumination instructions (act 2218), and can return to waiting for additional instructions (act 2220).

Figure 23:
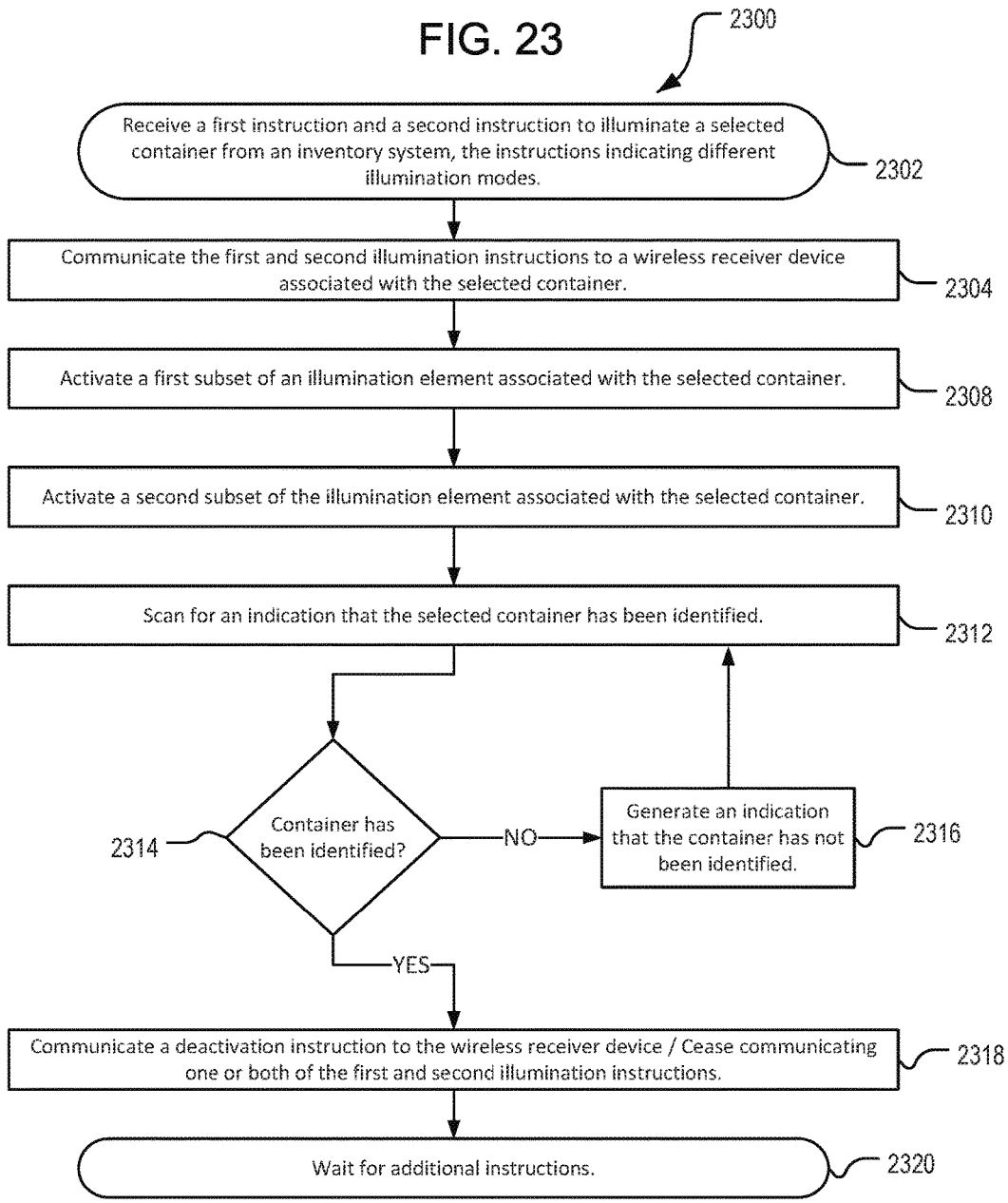
FIG. 23 illustrates another process for using an inventory management container in an inventory management system in accordance with embodiments.

FIG. 23 illustrates a fourth process 2300 for using an inventory management container, such as the container 700 (FIG. 7) in an inventory management system. Aspects of the process 2300 may be performed, in some embodiments, by a system similar to one of the inventory management systems 1800, 1900 (FIGS. 18-19). The systems may be implemented for applications and in environments such as those applications and environments shown in FIGS. 1-6.

In an embodiment, the process 2300 includes receiving first and second instructions for illuminating a selected container from the system (act 2302), where the first and second instructions can indicate different illumination modes, as described above in process 2200 (FIG. 22). Next, the first and second illumination instructions are communicated to a wireless receiver device associated with the selected container (act 2304) which can be any suitable wireless network device, and which can include processing and/or memory configured to perform certain functions in response to receiving instructions based on the content of the instructions as described above with respect to, e.g., the wireless receiver 1952 and onboard processor 1954 of system 1900 (FIG. 19). Based on receiving the instructions, the system can activate a first subset of an illumination element associated with the selected container (act 2308) and can activate a second subset of the illumination element associated with the selected container (act 2310) such that the first and second illumination instructions can result in the application of multiple illumination modes of the container. As described above with reference to process 2200 (FIG. 22), the illumination modes can be the same mode or can be different, and can further include a component of the selected container emitting or transmitting a response signal.

Next, the system can scan for an indication that the selected container has been identified (act 2312) via any technique for scanning as described above in reference to process 2100 (FIG. 21). While the container has not yet been identified (act 2314), the system can generate an indication that the container has not yet been identified (act 2316) and can iteratively scan (act 2312). When the container has been identified (act 2314), the system can communicate a deactivation instruction to the wireless receiver device and/or cease communicating one or both of the first and second illumination instructions to the wireless receiver device (act 2318), and can resume waiting for additional instructions (act 2320).

Figure 24:
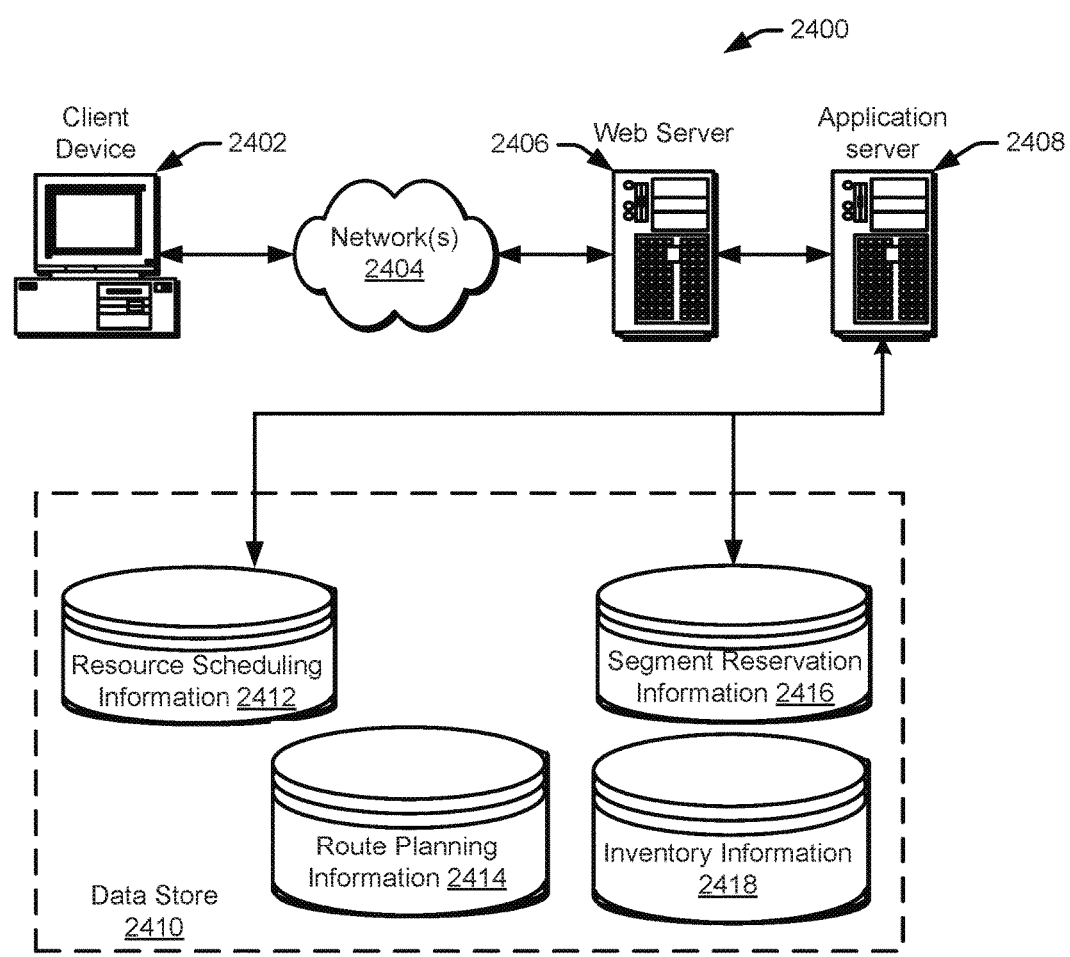
FIG. 24 illustrates an environment in which various features of the inventory system can be implemented, in accordance with embodiments.

FIG. 24 illustrates aspects of an example environment 2400 for implementing aspects in accordance with various embodiments. As will be appreciated, although a Web-based environment is used for purposes of explanation, different environments may be used, as appropriate, to implement various embodiments. The environment includes an electronic client device 2402, which can include any appropriate device operable to send and receive requests, messages, or information over an appropriate network 2404 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 2406 for receiving requests and serving content in response thereto, although for other networks an alternative device serving a similar purpose could be used as would be apparent to one of ordinary skill in the art.

The illustrative environment includes at least one application server 2408 and a data store 2410. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 2402 and the application server 2408, can be handled by the Web server. It should be understood that the Web and application servers are not required and are merely example components, as structured code discussed herein can be executed on any appropriate device or host machine as discussed elsewhere herein.

The data store 2410 can include several separate data tables, databases or other data storage mechanisms and media for storing data relating to a particular aspect. For example, the data store illustrated includes mechanisms for storing information which can be used by modules described herein, such as resource scheduling information 2412, route planning information 2414, segment reservation information 2416, and/or inventory information 2418. It should be understood that there can be many other aspects that may need to be stored in the data store, such as for page image information and to access right information, which can be stored in any of the above listed mechanisms as appropriate or in additional mechanisms in the data store 2410. The data store 2410 is operable, through logic associated therewith, to receive instructions from the application server 2408 and obtain, update or otherwise process data in response thereto.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 24. Thus, the depiction of the system 2400 in FIG. 24 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. An inventory management system, comprising:
   a signal receiver device comprising a removable wireless device, the removable wireless device comprising an identifier configured to store and transmit identity information associated with the signal receiver device;
   an inventory management container, comprising:
      an illumination element, and
      a container body that defines a void configured to receive the removable wireless device, the void having a contact therein configured to operably connect the removable wireless device with the illumination element; and
   an inventory manager including at least one processor and a tangible memory storing non-transitory instructions that, when performed by the processor, cause the inventory manager to:
      communicate an instruction to the signal receiver device; and cause activation of the illumination element of the inventory management container in response to the signal receiver device receiving the instruction.

2. The system of claim 1, wherein:
the signal receiver device comprises an RFID tag;
communicating the instruction to the signal receiver device comprises interrogating the RFID tag; and
causing activation of the illumination element of the inventory management container comprises, in response to interrogating the RFID tag, the RFID tag causing the illumination element to be electrically connected with a power source.

3. The system of claim 2, further comprising a platform having a platform contact element configured to supply electrical power to the inventory management container, and wherein the inventory management container comprises an onboard contact element configured to interact with the platform contact element.

4. The system of claim 1, further comprising a platform including a scanning element configured to scan a region associated with a site for situating the inventory management container, and wherein the instructions further cause the inventory manager to:
cause scanning of the region associated with the inventory management container;
determine that an inventory item has been placed in the inventory management container via the scanning of the region associated with the inventory management container; and
communicate a second instruction to the signal receiver device based on determining that the inventory item has been placed in the inventory management container.

5. The system of claim 4, wherein the instructions further cause the inventory manager to:
determine an identity of the inventory item placed in the inventory management container based on the scanning; and
cause activation of an illumination mode of the illumination element for indicating to a user that the inventory item has been received in the inventory management container, wherein the illumination mode is selected based in part on the identity of the inventory item matching an expected identity.

6. The system of claim 4, wherein the instructions further cause the inventory manager to:
detect via the scanning, that the inventory item placed in the inventory management container matches an expected identity; and
cause deactivation of the illumination of the inventory management container based in part on detecting that the inventory item placed in the inventory management container matches the expected identity.

7. A computer-implemented method, comprising:
communicating an illumination instruction to a signal receiver device connected with an inventory management container of an inventory system, wherein the signal receiver device comprises a removable wireless device removably connected with a container body of the inventory management container, the removable wireless device comprising an identifier configured to store and transmit identity information associated with the signal receiver device, and the container body comprises a void configured to receive the removable wireless device, the void having a contact therein configured to operably connect the removable wireless device with an illumination element; and causing illumination of the inventory management container via the illumination element connected with the inventory management container in response to the signal receiver device receiving the illumination instruction.

8. The computer-implemented method of claim 7, further comprising:
generating the illumination instruction based in part on receiving instructions to load or unload an inventory item into or from the inventory management container.

9. The computer-implemented method of claim 8, further comprising:
causing a scanner to scan a region associated with a site for situating the inventory management container;
detecting that the inventory item has been loaded into or unloaded from the inventory management container based on the scanning; and
causing deactivation of the illumination of the inventory management container based in part on detecting that the inventory item has been loaded into or unloaded from the inventory management container.

10. The computer-implemented method of claim 7, further comprising:
generating the illumination instruction based in part on receiving instructions to locate the inventory management container.

11. The computer-implemented method of claim 10, further comprising:
causing deactivation of the illumination of the inventory management container based in part on receiving an indication that the inventory management container has been located.

12. The computer-implemented method of claim 7, wherein the illumination instruction comprises at least a first instruction corresponding to a first illumination mode and a second instruction corresponding to a second illumination mode, the method further comprising:
causing illumination of the inventory management container according to the first illumination mode and the second illumination mode in response to the signal receiver device receiving the illumination instruction.

13. The computer-implemented method of claim 7, wherein communicating the illumination instruction to the signal receiver device comprises interrogating at least one RFID tag associated with the inventory management container.

14. A container for use in an inventory system, the container comprising:
a container body that defines a void;
an illumination element connected with the container body and configured to illuminate at least a portion of the container body; and
a signal receiver connected with the container body and configured to activate the illumination element based on a received signal, wherein:
the signal receiver comprises a removable wireless device removably connected with the container body, the removable wireless device comprising an identifier configured to store and transmit identity information associated with the signal receiver; and
the void is configured to receive the removable wireless device, the void having a contact therein configured to operably connect the removable wireless device with the illumination element.

15. The container of claim 14, wherein:
at least a portion of the container body comprises a transparent or translucent material; and the illumination element is at least partly embedded in the transparent or translucent material such that, when the illumination element is active, the illumination element illuminates the at least a portion of the container body.

16. The container of claim 14, wherein:

the container body comprises a substantially rectangular tote having four sides and a bottom; and the illumination element is connected with at least one of the four sides and arranged such that, when the illumination element is active, the illumination element directs light along the at least one of the four sides.

17. The container of claim 14, wherein:

the illumination element comprises a plurality of light sources; and at least some of the light sources of the plurality of light sources are embedded in one or more sides of the container body.

18. The container of claim 14, further comprising a contact element on an exterior surface of the container body, the contact element being configured to electrically connect an exterior connector to one or more of the illumination element, the signal receiver, and a power supply of the container.

19. The container of claim 14, wherein:

the container body further comprises a lip at an upper end of the container, the lip comprising a reflective surface facing substantially down along a sidewall of the container body; and the illumination element is arranged to direct light toward the reflective surface when the illumination element is active, such that the reflective surface causes light to reflect back onto the sidewall of the container body.

20. The computer-implemented method of claim 7, further comprising:

comparing an identity of an inventory item in the container with an expected identity;

causing illumination of the inventory management container via the illumination element according to a first illumination mode or a second illumination mode, wherein the first or second illumination mode is selected based on whether the identity of the inventory item matches the expected identity.

21. The container of claim 14, wherein the signal receiver is operable to interchangeably connect with a second container body to cause illumination of the second container body.

* * * * *